(12) United States Patent
Yang et al.

(10) Patent No.: US 10,999,039 B2
(45) Date of Patent: May 4, 2021

(54) PROVIDING ACKNOWLEDGEMENT/NEGATIVE ACKNOWLEDGEMENT (ACK/NACK) FEEDBACK FOR DOWNLINK SEMI-PERSISTENT SCHEDULING (SPS) WITH SUB-SLOT PERIODICITY

(71) Applicant: QUALCOMM Incorporated, San Diego, CA (US)

(72) Inventors: Wei Yang, San Diego, CA (US); Sony Akkarakaran, Poway, CA (US); Yi Huang, San Diego, CA (US); Jing Jiang, San Diego, CA (US); Joseph Soriaga, San Diego, CA (US); Chih-Ping Li, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/413,390

(22) Filed: May 15, 2019

(65) Prior Publication Data
US 2019/0356455 A1  Nov. 21, 2019

Related U.S. Application Data

(60) Provisional application No. 62/673,980, filed on May 20, 2018.

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1812* (2013.01); *H04L 1/1854* (2013.01); *H04L 1/1861* (2013.01); *H04W 72/0446* (2013.01)

(58) Field of Classification Search
CPC .................... H04L 5/0055; H04W 72/0446
See application file for complete search history.

(56) References Cited

U.S. PATENT DOCUMENTS

| 2014/0036856 A1* | 2/2014 | Park | H04L 5/0053 |
| | | | 370/329 |
| 2015/0271798 A1* | 9/2015 | Chen | H04L 5/0053 |
| | | | 370/329 |

(Continued)

OTHER PUBLICATIONS

CATT: "Discussion on DL/UL Scheduling and HARQ Management," 3GPP TSG RAN WG1 Meeting AH_#NR3, 3GPP Draft; R1-1716658, 3rd Generation Partnership Project (3GPP), Mobile Competence Centre; 650, Route Des Lucioles; 7-06921 Sophia-Antipolis Cedex; France, vol. RAN WG1, No. Nagoya, Japan; Sep. 18, 2017-Sep. 21, 2017, Sep. 17, 2017, XP051340108, 6 pages, Retrieved from the Internet: URL: http://www.3gpp.org/ftp/Meetings_3GPP_SYNC/RAN1/Docs/ [retrieved on Sep. 17, 2017].

(Continued)

*Primary Examiner* — Fahmida S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration that indicates a first sub-slot periodicity for downlink semi-persistent scheduling (SPS). The UE may receive a plurality of transmissions according to the first sub-slot periodicity in a first slot, wherein the first sub-slot periodicity enables receiving the plurality of transmissions within a single slot. The UE may transmit hybrid automatic repeat request acknowledgement (HARQ-ACK) information in a second slot, wherein the second slot includes a plurality of physical uplink control channels (PUCCHs) with a second sub-slot periodicity, and (Continued)

wherein the HARQ-ACK information is associated with the plurality of transmissions. Numerous other aspects are provided.

50 Claims, 15 Drawing Sheets

(56) References Cited

U.S. PATENT DOCUMENTS

2016/0211950 A1\* 7/2016 Cheng ............... H04W 72/0413
2018/0146460 A1\* 5/2018 Lee ................... H04W 72/0446
2018/0323909 A1\* 11/2018 Ying ..................... H04L 1/0072
2019/0281606 A1\* 9/2019 Liu ................... H04W 72/0446
2020/0275431 A1\* 8/2020 Bae ....................... H04W 72/04

OTHER PUBLICATIONS

International Search Report and Written Opinion—PCT/US2019/032676—ISA/EPO—dated Aug. 23, 2019.

\* cited by examiner

PROVIDING ACKNOWLEDGEMENT/NEGATIVE ACKNOWLEDGEMENT (ACK/NACK) FEEDBACK FOR DOWNLINK SEMI-PERSISTENT SCHEDULING (SPS) WITH SUB-SLOT PERIODICITY

CROSS-REFERENCE TO RELATED APPLICATIONS UNDER 35 U.S.C. § 119

This application claims priority to U.S. Provisional Patent Application No. 62/673,980, filed on May 20, 2018, entitled "TECHNIQUES AND APPARATUSES FOR PROVIDING ACKNOWLEDGEMENT/NEGATIVE ACKNOWLEDGEMENT (ACK/NACK) FEEDBACK FOR DOWNLINK SEMI-PERSISTENT SCHEDULING (SPS) WITH SUB-SLOT PERIODICITY," which is hereby expressly incorporated by reference herein.

FIELD OF THE DISCLOSURE

Aspects of the present disclosure generally relate to wireless communication and to techniques and apparatuses for providing acknowledgement/negative acknowledgement (ACK/NACK) feedback for downlink semi-persistent scheduling (SPS) with sub-slot periodicity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a configuration that indicates a first sub-slot periodicity for downlink semi-persistent scheduling (SPS); receiving a plurality of transmissions according to the first sub-slot periodicity in a first slot, wherein the first sub-slot periodicity enables receiving the plurality of transmissions within a single slot; and transmitting hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions.

In some aspects, a user equipment for wireless communication may include memory and one or more processors operatively coupled to the memory. The memory and the one or more processors may be configured to receive a configuration that indicates a first sub-slot periodicity for downlink semi-persistent scheduling (SPS); receive a plurality of transmissions according to the first sub-slot periodicity in a first slot, wherein the first sub-slot periodicity enables receiving the plurality of transmissions within a single slot; and transmit hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions.

In some aspects, a non-transitory computer-readable medium may store one or more instructions for wireless communication. The one or more instructions, when executed by one or more processors of a user equipment, may cause the one or more processors to receive a configuration that indicates a first sub-slot periodicity for downlink semi-persistent scheduling (SPS); receive a plurality of transmissions according to the first sub-slot periodicity in a first slot, wherein the first sub-slot periodicity enables receiving the plurality of transmissions within a single slot; and transmit hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions.

In some aspects, an apparatus for wireless communication may include means for receiving a configuration that indicates a first sub-slot periodicity for downlink semi-persistent scheduling (SPS); means for receiving a plurality of transmissions according to the first sub-slot periodicity in a first slot, wherein the first sub-slot periodicity enables receiving the plurality of transmissions within a single slot; and means for transmitting hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions.

In some aspects, a method of wireless communication, performed by a user equipment (UE), may include receiving a configuration that indicates a sub-slot periodicity for downlink semi-persistent scheduling (SPS); receiving a plurality of transmissions within a single slot according to the sub-slot periodicity; and transmitting hybrid automatic repeat request acknowledgement (HARQ-ACK) information associated with receiving the plurality of transmissions within the single slot based at least in part on a HARQ-ACK feedback scheme associated with the downlink SPS.

In some aspects, a user equipment for wireless communication may include memory and one or more processors operatively coupled to the memory. The memory and the one or more processors may be configured to receive a configuration that indicates a sub-slot periodicity for downlink semi-persistent scheduling (SPS); receive a plurality of transmissions within a single slot according to the sub-slot periodicity; and transmit hybrid automatic repeat request acknowledgement (HARQ-ACK) information associated with receiving the plurality of transmissions within the single slot based at least in part on a HARQ-ACK feedback scheme associated with the downlink SPS.

In some aspects, a non-transitory computer-readable medium may store one or more instructions for wireless communication. The one or more instructions, when executed by one or more processors of a user equipment, may cause the one or more processors to receive a configuration that indicates a sub-slot periodicity for downlink semi-persistent scheduling (SPS); receive a plurality of transmissions within a single slot according to the sub-slot periodicity; and transmit hybrid automatic repeat request acknowledgement (HARQ-ACK) information associated with receiving the plurality of transmissions within the single slot based at least in part on a HARQ-ACK feedback scheme associated with the downlink SPS.

In some aspects, an apparatus for wireless communication may include means for receiving a configuration that indicates a sub-slot periodicity for downlink semi-persistent scheduling (SPS); means for receiving a plurality of transmissions within a single slot according to the sub-slot periodicity; and means for transmitting hybrid automatic repeat request acknowledgement (HARQ-ACK) information associated with receiving the plurality of transmissions within the single slot based at least in part on a HARQ-ACK feedback scheme associated with the downlink SPS.

In some aspects, a method of wireless communication, performed by a base station (BS), may include transmitting a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information; and decoding the HARQ-ACK information, received from the UE via one or more PUCCH transmissions, based at least in part on the configuration.

In some aspects, a base station for wireless communication may include memory and one or more processors operatively coupled to the memory. The memory and the one or more processors may be configured to transmit a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information; and decode the HARQ-ACK information, received from the UE via one or more PUCCH transmissions, based at least in part on the configuration.

In some aspects, a non-transitory computer-readable medium may store one or more instructions for wireless communication. The one or more instructions, when executed by one or more processors of a base station, may cause the one or more processors to transmit a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information; and decode the HARQ-ACK information, received from the UE via one or more PUCCH transmissions, based at least in part on the configuration.

In some aspects, an apparatus for wireless communication may include means for transmitting a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information; and means for decoding the HARQ-ACK information, received from the UE via one or more PUCCH transmissions, based at least in part on the configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
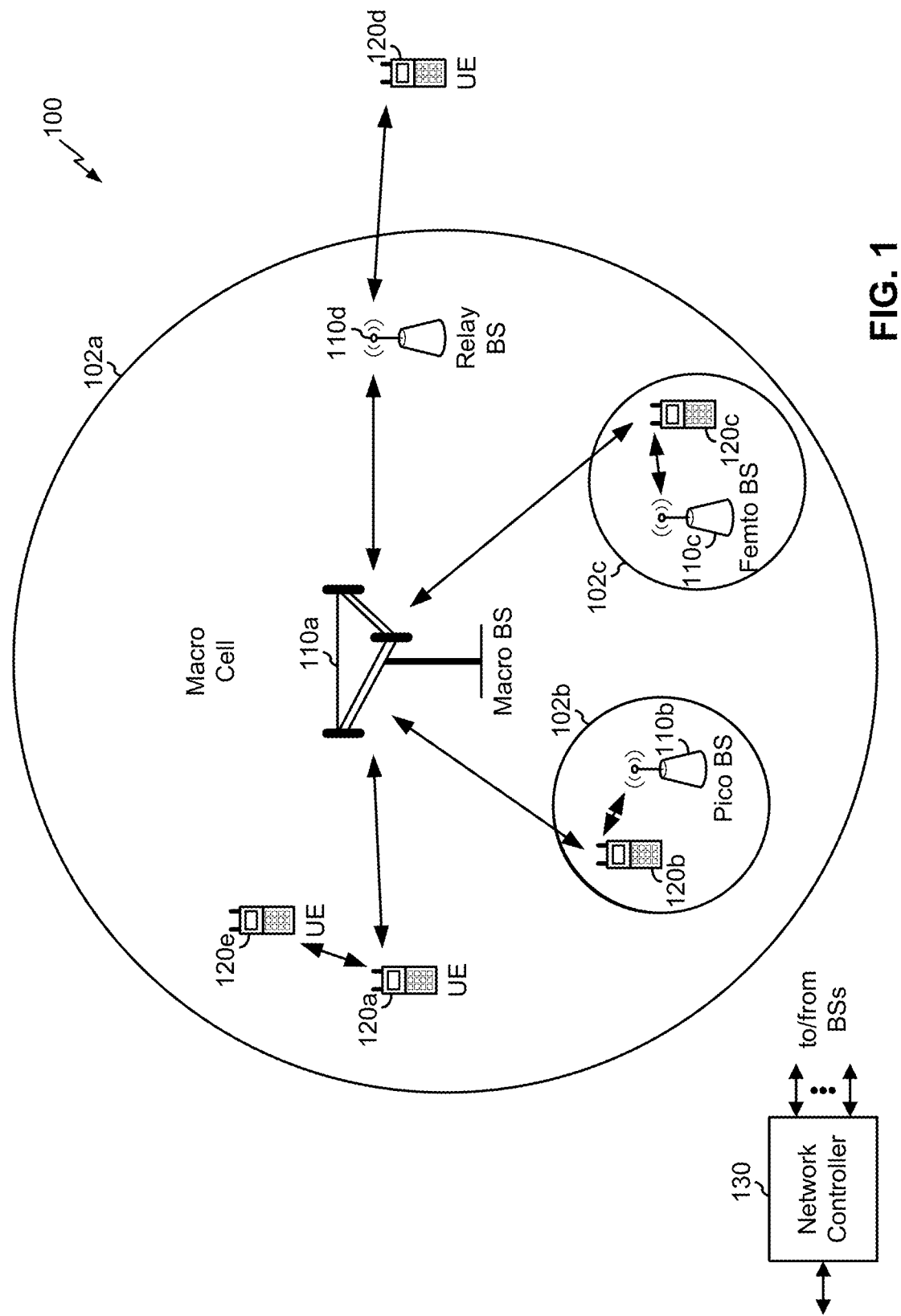
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
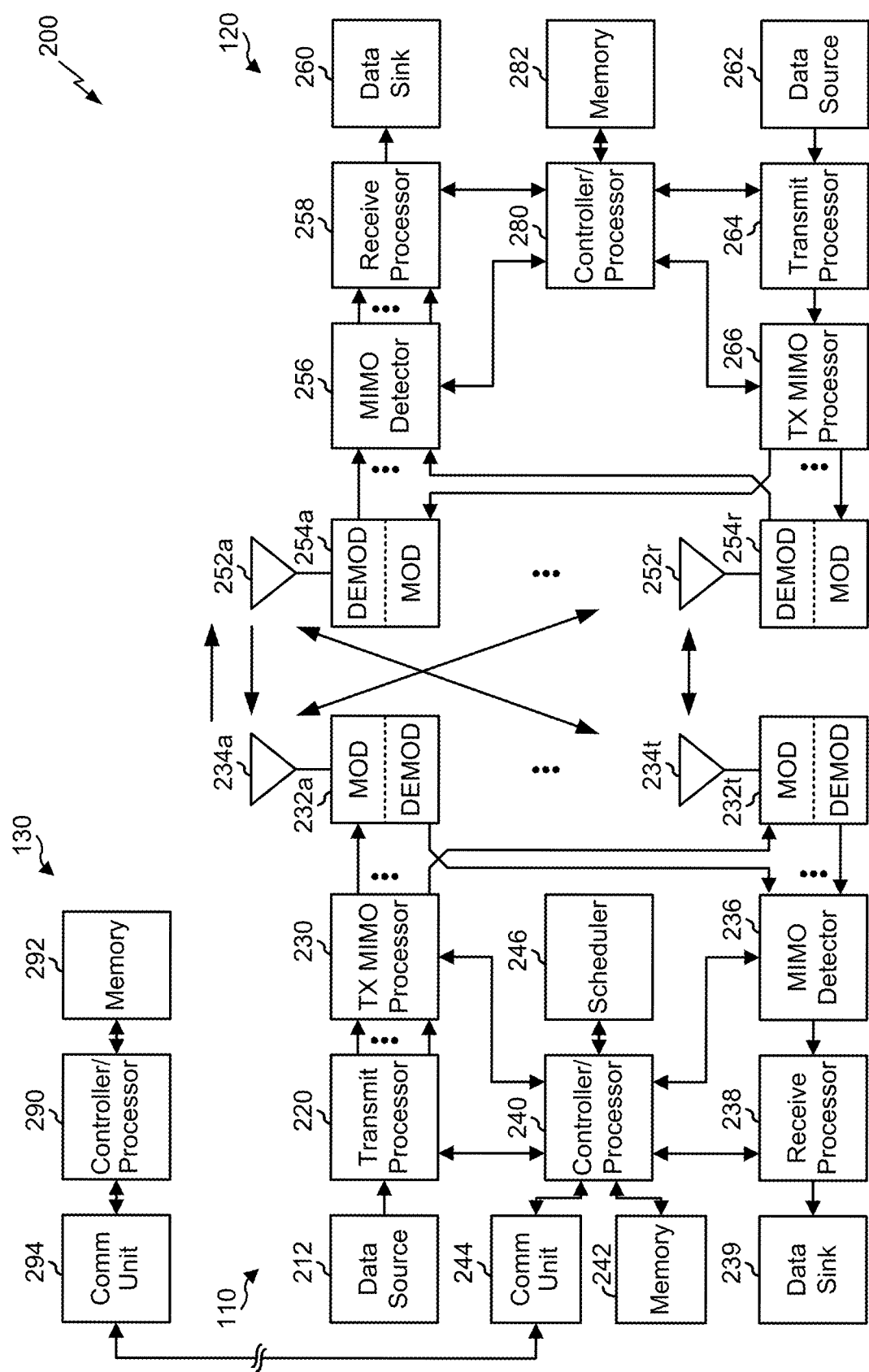
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with providing acknowledgement/negative acknowledgement (ACK/NACK) feedback for downlink semi-persistent scheduling (SPS) with sub-slot periodicity, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a configuration that indicates a first sub-slot periodicity for downlink semi-persistent scheduling (SPS); means for receiving a plurality of transmissions according to the first sub-slot periodicity in a first slot, wherein the first sub-slot periodicity enables receiving the plurality of transmissions within a single slot; means for transmitting hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions; and/or the like. In some aspects, such means may include one or more components of UE 120 described in connection with FIG. 2.

In some aspects, UE 120 may include means for receiving a configuration that indicates a sub-slot periodicity for downlink semi-persistent scheduling (SPS); means for receiving a plurality of transmissions within a single slot according to the sub-slot periodicity; means for transmitting hybrid automatic repeat request acknowledgement (HARQ-ACK) information associated with receiving the plurality of transmissions within the single slot based at least in part on a HARQ-ACK feedback scheme associated with the down-link SPS; and/or the like. In some aspects, such means may include one or more components of UE 120 described in connection with FIG. 2.

In some aspects, base station 110 may include means for transmitting a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information; means for decoding the HARQ-ACK information, received from the UE via one or more PUCCH transmissions, based at least in part on the configuration; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
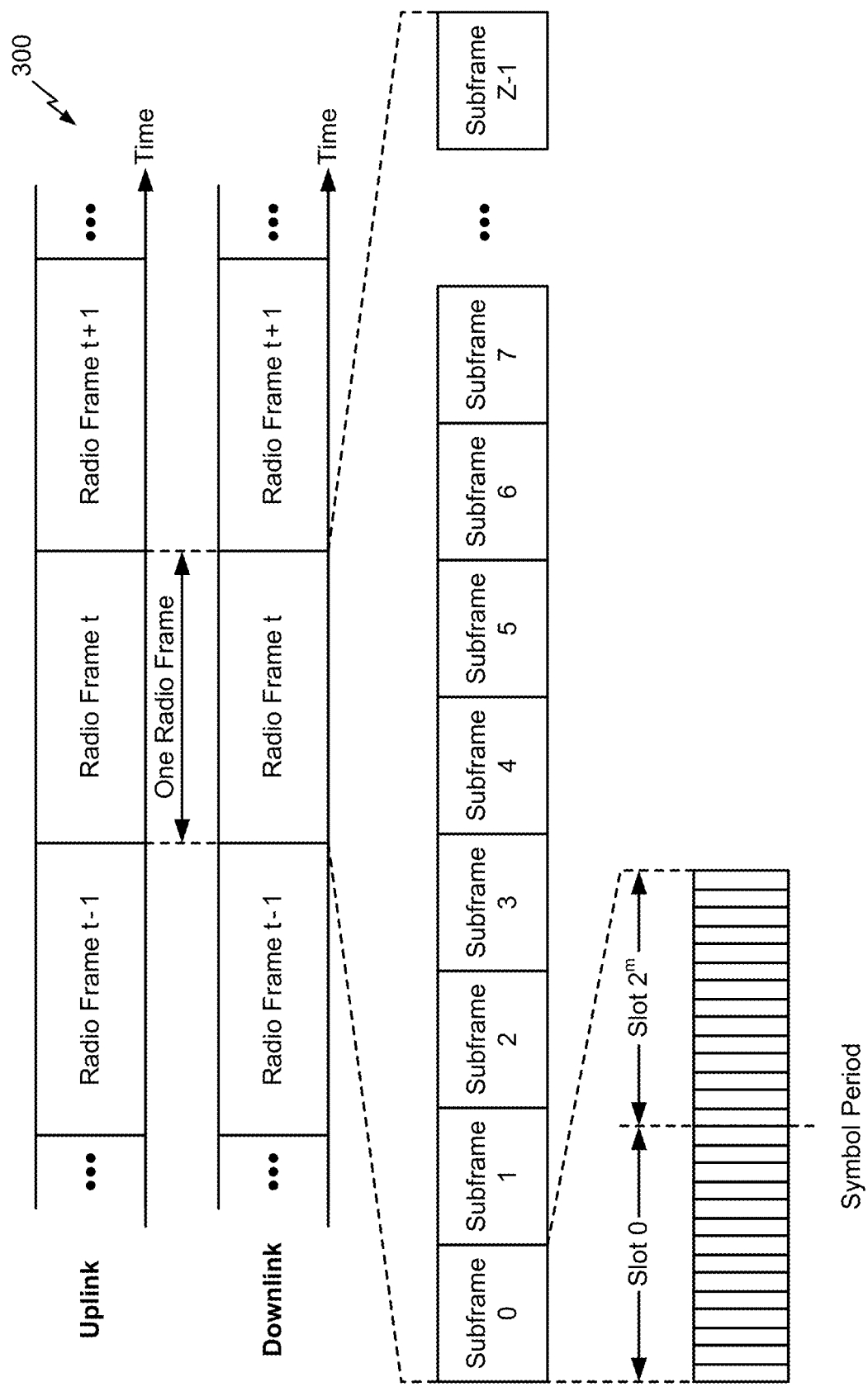
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
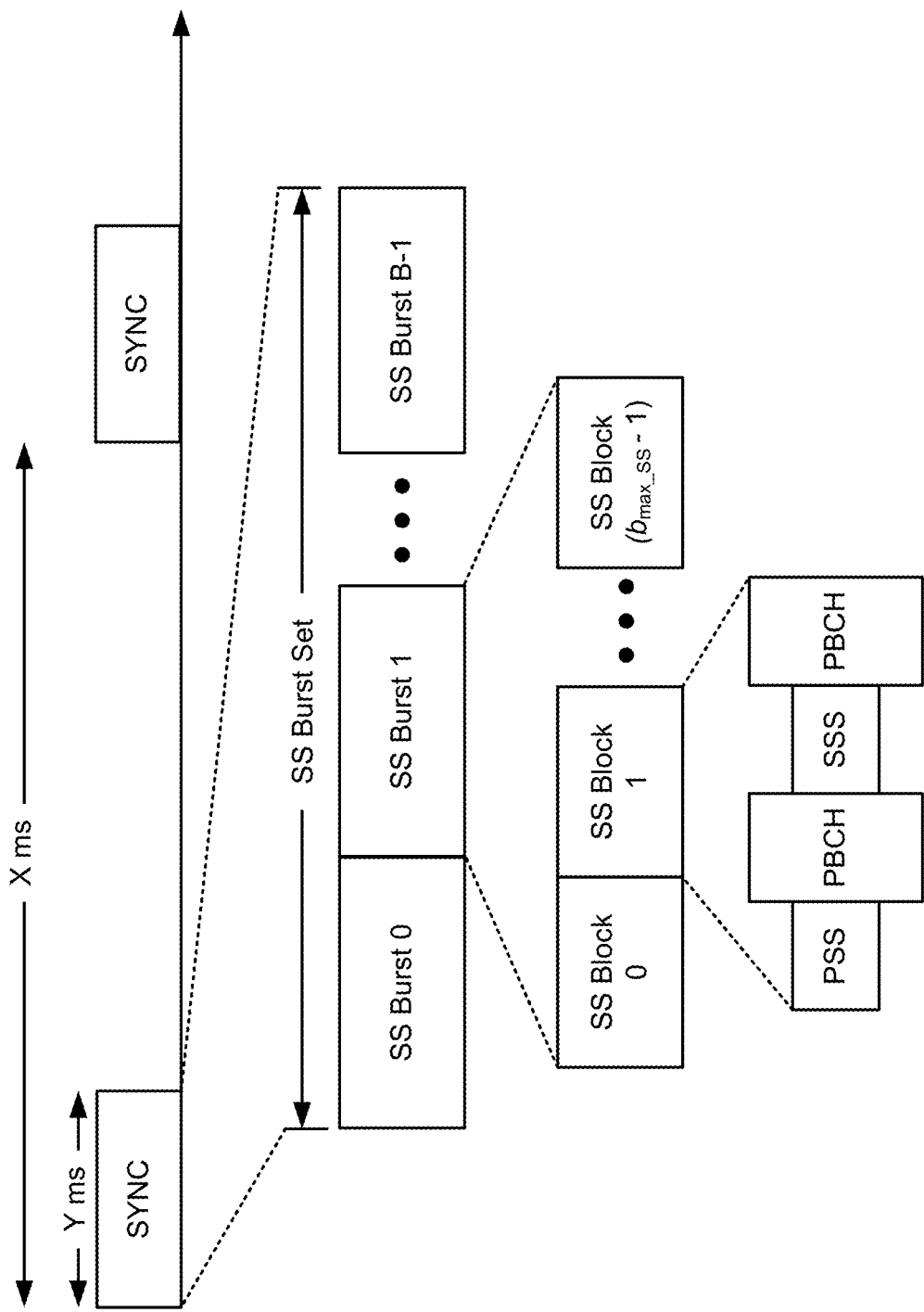
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
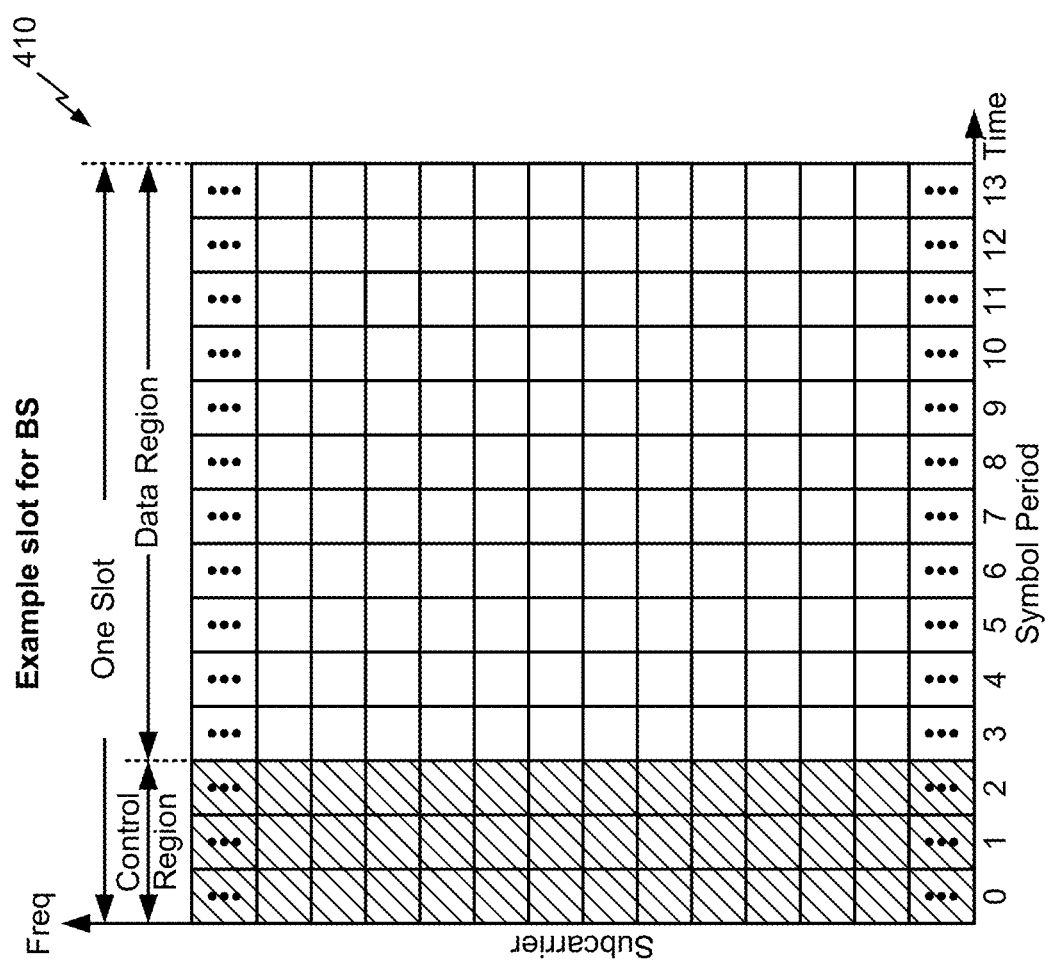
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
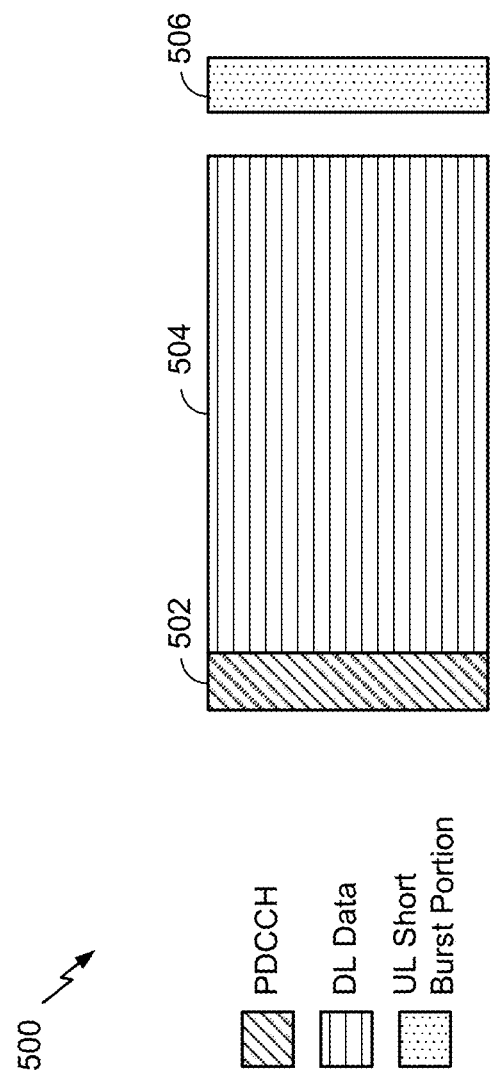
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH). In some aspects, a plurality of PDSCH transmission may be transmitted within a single slot, as described herein.

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

In some aspects, a plurality of ACK/NACKs may be transmitted via PUCCH transmission resources within a single slot, based at least in part on a number of PDSCH transmissions received in a previous slot.

As indicated above, FIG. 5 is provided merely as an example. Other examples are possible and may differ from what was described with regard to FIG. 5.

Figure 6:
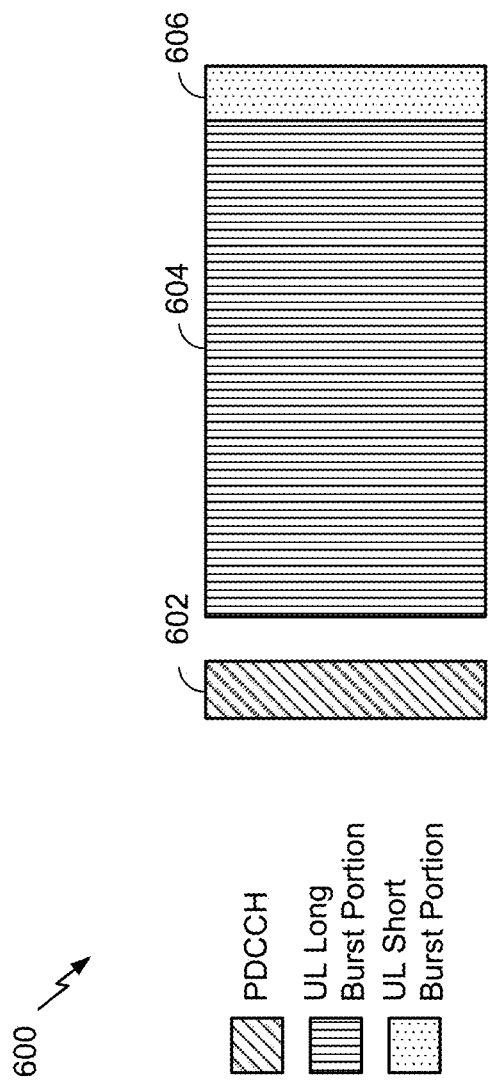
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples are possible and may differ from what was described with regard to FIG. 6.

In some instances, a BS and a UE may communicate using semi-persistent scheduling (SPS). In such cases, for downlink SPS, a periodicity associated with downlink transmissions (e.g., a length of time between PDSCH transmissions) can be equal to or greater than a length of a slot (e.g., periodicity ≥14 symbols). Furthermore, a single ACK/NACK feedback (also referred to as hybrid automatic repeater request acknowledgement (HARQ-ACK) information) associated with receiving downlink transmissions is designated to be sent per slot. For example, the BS may configure (e.g., via an SPS configuration) one PUCCH resource per slot for ACK/NACK feedback (e.g., for a one bit ACK/NACK). However, in some aspects, downlink SPS can be configured, such that the periodicity is less than the length of a slot (referred to herein as sub-slot periodicity), such that multiple downlink transmissions (e.g., PDSCH transmissions) may be transmitted (e.g., by the BS) and received (e.g., by the UE) within a same slot. As used herein, the terms ACK/NACK, ACK/NACK feedback, or the like may be used interchangeably with the terms HARQ-ACK or HARQ-ACK information. HARQ-ACK information may include an ACK or a NACK depending on whether a corresponding communication was successfully received and decoded.

Some aspects described herein enable transmission of ACK/NACK(s) for downlink SPS with sub-slot periodicity (e.g., receiving multiple downlink SPS transmissions within a single slot). In some aspects described herein, a configuration for downlink SPS is provided to a UE that indicates a configuration of PUCCH resources for the transmission of respective ACK/NACKs for received transmissions (e.g., downlink transmissions, such as PDSCH transmissions). In some aspects, the configuration of PUCCH resources may indicate that a single PUCCH resource is allocated for the ACK/NACK feedback. In such cases, the UE may multiplex respective ACK/NACKs (e.g., to create ACK/NACK feedback having a number of bits that corresponds to the number of received transmissions) and/or bundle respective ACK/NACKs (e.g., use a one bit ACK/NACK representative of whether all transmissions were received or all transmissions were not received) to generate the ACK/NACK feedback associated with receiving a plurality of transmissions within a single slot. In some aspects, the configuration of the PUCCH resources may allocate multiple PUCCH resources (e.g., at least two PUCCH resources), such that the ACK/NACK feedback can be transmitted with sub-slot periodicity. In such cases, the ACK/NACK feedback that is transmitted via each PUCCH resource can include respective ACK/NACKs that are multiplexed and/or bundled for groups of transmissions received within a single slot. Additionally, or alternatively, a PUCCH resource may be allocated for each transmission, such that respective ACK/NACKs can be transmitted with a same sub-slot periodicity as the received transmissions.

Accordingly, some aspects, described herein, can support ultra-reliable low latency (URLLC) traffic via downlink SPS transmissions with sub-slot periodicity by providing ACK/NACK feedback with respective ACK/NACKs for the downlink SPS transmissions. As described herein, techniques and apparatuses for providing ACK/NACK feedback decreases the latency associated with sending ACK/NACK feedback for transmissions received with sub-slot periodicity. The ACK/NACK feedback can be associated with multiple transmissions received within a single slot and can be included within one or multiple bits of a second slot, rather than being associated with a single transmission and being included within a single bit per slot, as done using previous techniques. As such, a BS may not need wait for and/or monitor multiple slots to receive ACK/NACK feedback for a plurality of transmissions sent within a single slot. As such, the BS can more quickly determine, from the ACK/NACK feedback, whether one or more retransmissions (e.g., of a hybrid automatic repeat request (HARD) process) of the transmissions are needed relative to previous techniques. Therefore, processing resources (e.g., to monitor for an extended number of slots) and/or network resources can be conserved (e.g., by avoiding the need to drop packets and/or transmissions associated with URLLC traffic due to delays in receiving ACK/NACK feedback and/or exceeding a timing threshold associated with the URLLC traffic).

Figure 7:
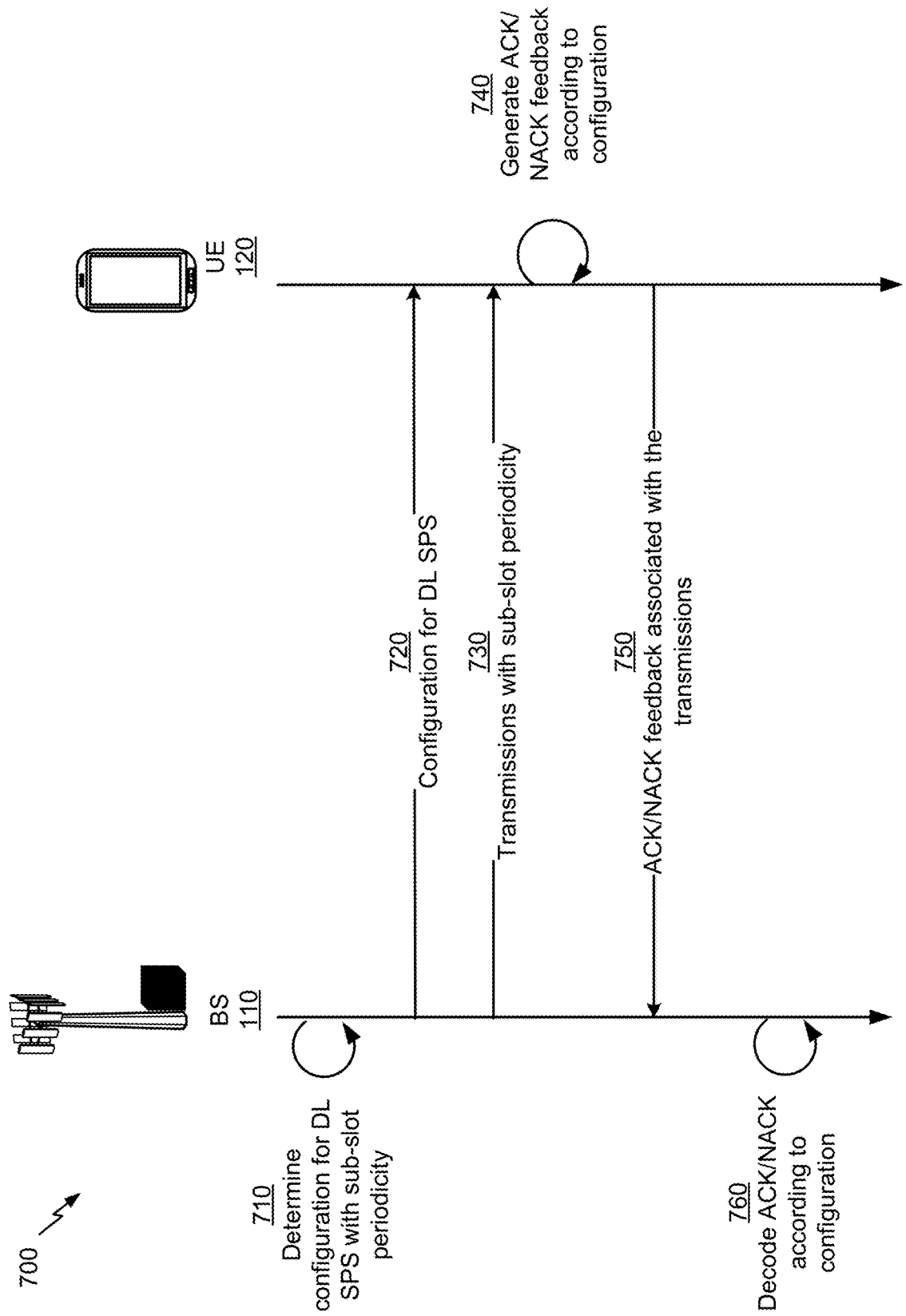
FIGS. 7-11 are diagrams illustrating examples of providing acknowledgement/negative acknowledgement (ACK/NACK) feedback for downlink semi-persistent scheduling (SPS) with sub-slot periodicity, in accordance with various aspects of the present disclosure.

FIG. 7 is a diagram illustrating an example 700 of providing acknowledgement/negative acknowledgement (ACK/NACK) feedback for downlink semi-persistent scheduling (SPS) with sub-slot periodicity, in accordance with various aspects of the present disclosure. In example 700 of FIG. 7, a BS 110 and a UE 120 are configured to communicate via SPS and/or dynamic scheduling. Furthermore, BS 110 may be capable of sending transmissions (e.g., downlink SPS transmissions via PDSCH resources) with sub-slot periodicity. Accordingly, UE 120 may be configured (e.g., via a configuration for SPS received from BS 110) to provide ACK/NACK feedback, for the downlink SPS with sub-slot periodicity, within a single slot according to a PUCCH configuration.

As shown in FIG. 7, and by reference number 710, BS 110 determines a configuration for downlink (DL) SPS with sub-slot periodicity. The example configuration may include the sub-slot periodicity (e.g., a 2-symbol periodicity, a 7-symbol periodicity, and/or the like) for receiving transmissions (e.g., PDSCH transmissions). Furthermore, the configuration may include a PUCCH configuration for ACK/NACK feedback that is to be transmitted by UE 120 in association with receiving the transmissions. In some aspects, the PUCCH configuration may identify a number of PUCCH resources and/or a PUCCH format (e.g., PUCCH format 0, PUCCH format 1, PUCCH format 2, PUCCH format 3, PUCCH format 4, and/or the like) that is to be used to transmit the ACK/NACK feedback. In some aspects, the format of the PUCCH may depend on the sub-slot periodicity of the transmissions.

In some aspects, BS 110 may include a bitmap in the configuration that indicates a plurality of starting locations for a plurality of PDSCH transmissions within the slot. For example, the bitmap may have a length of 14 (corresponding to the 14 symbols of the slot). As a specific example, BS 110 may configure a bitmap of 01001000010000, which identifies three PDSCH transmissions per slot and the first PDSCH transmission starts at symbol number 1 (starting from symbol 0), the second PDSCH transmission starts at symbol 4, and the third PDSCH transmission starts at symbol 9. In some aspects, BS 110 may dynamically indicate the length or duration (e.g., in symbols) of the PDSCH transmissions via DCI. Such a configuration may be used within and/or associated with a time division duplex (TDD) system, as all symbols may not be used for a downlink transmission in a TDD system.

In some aspects, BS 110 may identify, via the configuration, which scheme is to be used for the ACK/NACK feedback. For example, the scheme (e.g., an ACK/NACK feedback scheme) may correspond to whether to multiplex or bundle the ACK/NACK feedback, whether the ACK/NACK feedback is to be transmitted via one or multiple PUCCH resources, and/or the like. In some aspects, the scheme is semi-statically configured (e.g., via RRC signaling) or dynamically signaled (e.g., via DCI, such as a DCI that activates SPS or includes SPS activation).

In some aspects, the configuration may indicate timing associated with sending the ACK/NACK feedback for received transmissions. For example, the configuration may include one or more of timings, K0, K1, and K2 (which may be referred to generally as a "K timing" and collectively herein as "K timings"), that are associated with various times or moments of a communication (e.g., a URLLC communication) between BS 110 and UE 120. For example, K0 refers to a timing between a downlink resource grant on a physical downlink control channel (PDCCH) and a downlink data transmission on a physical downlink shared channel (PDSCH), K1 refers to timing between a downlink data transmission on the PDSCH and an uplink acknowledgement/negative acknowledgement (ACK/NACK) on a physical uplink control channel (PUCCH), and K2 refers to timing between an uplink resource grant on the PDCCH and an uplink data transmission on the PUCCH. Accordingly, as described herein, UE 120 may use the K1 timing to determine when the ACK/NACK feedback is to be transmitted to BS 110 and/or which PUCCH resource (and/or corresponding starting symbol) is to be used to transmit the ACK/NACK feedback.

BS 110 may configure one PUCCH resource to carry M bits, where M is the number of downlink SPS PDSCH transmissions per slot. In such cases, if M>2, BS 110 may configure a PUCCH resource with PUCCH format 2, PUCCH format 3, or PUCCH format 4 (e.g., for ACK/NACK feedback that is greater than two bits). Furthermore, if M≤2, BS 110 may configure a PUCCH resource with PUCCH format 0 or PUCCH format 1 (for one bit or two bit ACK/NACK). Additionally, or alternatively, BS 110 may configure two or more PUCCH resources per slot. Such a configuration may include a frequency, time, and/or spatial domain allocation of the PUCCH resources and corresponding PUCCH formats. In some aspects, BS 110 may use DCI (e.g., DCI that activates SPS or includes SPS activation) to signal a time-domain gap between the two PUCCH resources. In some aspects, BS 110 may configure M PUCCH resources per slot, where M is the number of downlink SPS PDSCH transmissions per slot. In such cases, the M PUCCH resources may or may not be uniformly spaced in time.

As further shown in FIG. 7, and by reference number 720, BS 110 transmits the configuration for the downlink SPS to UE 120. In some aspects, the configuration can by semi-statically transmitted (e.g., periodically or in response to a particular event) and/or dynamically transmitted (e.g., per slot, per transmission, per set of transmissions, and/or the like). For example, the configuration may be transmitted via radio resource control (RRC) signaling, DCI (e.g., DCI that activates SPS or includes SPS activation), and/or the like.

As further shown in FIG. 7, and by reference number 730, BS 110 provides transmissions with sub-slot periodicity. For example, BS 110 sends multiple transmissions within a single slot, such that a period between the transmissions is less than 14 symbols. As an example, BS 110 may send seven transmissions within a slot (or per slot) with a periodicity of two symbols, two transmissions within a slot (or per slot) with a periodicity of seven symbols, and/or the like. UE 120 may be configured to receive the transmissions with sub-slot periodicity according to the configuration for the downlink SPS. For example, UE 120 may monitor PDSCH resources of the slot to determine whether the transmissions are successfully or unsuccessfully received and generate corresponding ACK/NACK feedback.

As further shown in FIG. 7, and by reference number 740, UE 120 generates ACK/NACK feedback according to the configuration. In some aspects, the ACK/NACK feedback may be generated in accordance with using one PUCCH resource. Additionally, or alternatively, the ACK/NACK feedback may be generated in accordance with using multiple PUCCH resources.

In some aspects, the ACK/NACK feedback may include a plurality of bits corresponding to the number of transmissions (e.g. PDSCH transmissions) received in the slot. In such cases, each bit may correspond to an ACK/NACK (e.g., an ACK=1 and a NACK=0, or vice versa). Accordingly, UE 120 may generate the ACK/NACK feedback by combining (or multiplexing) the respective ACK/NACKs to generate a multi-bit ACK/NACK feedback in association with the transmissions received in that slot.

In some aspects, the ACK/NACK feedback may include a single bit representative of whether all of the transmissions were received within the slot or all of the transmissions were not received within the slot. For example, if all transmissions were successfully received, the ACK/NACK feedback may include a single ACK bit and if all transmissions were not successfully received, the ACK/NACK feedback may include a single NACK bit. Accordingly, UE 120 may generate the ACK/NACK feedback by combining (or bundling) the respective ACK/NACKs to generate a single bit ACK/NACK feedback in association with the transmissions received in that slot.

In some aspects, the ACK/NACK feedback can be generated to include multiple sets of ACK/NACK feedback (e.g., that are configured to be transmitted via multiple PUCCH resources). Each set of ACK/NACK feedback may include one or more ACK/NACK bits. For example, for each transmission received (e.g., via the PDSCH), a corresponding ACK/NACK can be generated. In some aspects, each set of ACK/NACK feedback can be generated in association with a group of one or more received transmissions. For example, the configuration may indicate that a first set of ACK/NACK feedback is to be generated for a first group of transmissions received via a first group of PDSCH resources and a second set of ACK/NACK feedback is to be generated for a second group of transmissions received via a second group of PDSCH resources.

In some aspects, for each allocated PDSCH resource of the configuration, a corresponding PUCCH resource may be allocated for ACK/NACK feedback. For example, if seven transmissions are received in a slot, then seven ACK/NACK feedback can be generated to be sent via seven separate PUCCH resources.

In some aspects, UE 120 generates the ACK/NACK feedback based at least in part on one or more timeline requirements for UE 120 to process reception of the transmissions. For example, UE 120 may have a processing timeline requirement that N1 symbols (e.g., OFDM symbols) are to be between receiving a transmission via a PDSCH resource and transmitting and sending a corresponding ACK/NACK. As such, in some aspects, the configuration of the SPS and the PUCCH configuration (e.g., associated with the configuration of the SPS and/or DCI) may allocate resources of the PDSCH, for receiving the transmission, and the PUCCH, for transmitting the ACK/NACK feedback, that do not satisfy the timeline requirement. Accordingly, UE 120 may not be able to provide ACK/NACK feedback for all received transmissions because there may not be enough time to process receipt of the transmissions that do not satisfy the timeline requirement in order to send the ACK/NACK via the designated PUCCH resource(s). Accordingly, the ACK/NACK feedback may only represent the transmissions that are received in enough time and/or that satisfy the timeline requirement N1 of UE 120. In such cases, ACK/NACKs for transmissions that are received late, or without enough time to be processed and/or included within ACK/NACK feedback, may be designated as NACKs (or not successfully received). Additionally, or alternatively, the ACK/NACK feedback can include a bundled ACK/NACK for the transmissions that satisfied the timeline requirement. In some aspects, the bundled ACK/NACK may be multiplexed with dynamically scheduled ACK/NACK feedback. In some aspects, when at least one of the transmissions associated with SPS does not satisfy the time line requirement, the ACK/NACK feedback for the SPS transmissions may be dropped. Additionally, or alternatively, when at least one of the transmissions associated with SPS does not satisfy the time line requirement, all ACK/NACK feedback for that slot can be dropped, including any dynamically scheduled ACK/NACKs.

As further shown in FIG. 7, and by reference number 750, UE 120 sends the ACK/NACK feedback associated with the transmissions. The ACK/NACK feedback may be transmitted via one or more PUCCH resources in a slot that is subsequent to the slot that included the transmissions. The second slot may indicated via a K1 timing indicated in DCI provided by BS 110.

The ACK/NACK feedback may be transmitted according to a PUCCH configuration received in association with the configuration of the downlink SPS. Additionally, or alternatively, the ACK/NACK feedback may be transmitted according to a PUCCH resource indicator (sometimes referred to as an ACK/NACK resource indicator (ARI)) of DCI dynamically received via a PDCCH which activates the downlink SPS transmission. In some aspects, the ACK/NACK feedback can be transmitted with sub-slot periodicity, such that multiple sets of ACK/NACK feedback are transmitted within a single slot. The sub-slot periodicity, associated with UE 120 transmitting the ACK/NACK feedback, may be the same or different than the sub-slot periodicity of UE 120 receiving the transmissions.

As further shown in FIG. 7, and by reference number 760, BS 110 decodes the ACK/NACK feedback according to the configuration. In some aspects, BS 110 further decodes the ACK/NACK feedback according to DCI. As such, BS 110 may be configured to decode the ACK/NACK feedback based at least in part on the PUCCH format associated with ACK/NACK feedback. For example, BS 110 may be configured to decode one bit ACK/NACK feedback or multiple bit ACK/NACK feedback (e.g., a two bit ACK/NACK feedback, a seven bit ACK/NACK feedback, and/or the like). Furthermore, in some aspects, BS 110 may be configured to decode multiple sets of ACK/NACK feedback within a same slot and/or that is received via multiple PUCCH resources of the same slot. For example, BS 110 may monitor a first set of PUCCH resources for a first set of ACK/NACK feedback and a second set of PUCCH resources for a second set of ACK/NACK feedback. In such cases, the first and second sets of ACK/NACK feedback may be respective multiplexed ACK/NACKs or a bundled ACK/NACK associated with first and second groups of transmissions, according to the configuration of the downlink SPS.

In some aspects, BS 110 may determine a HARQ process identifier (ID) associated with each downlink SPS transmission. In some aspects, the HARQ process ID may be determined based at least in part on a starting symbol number of a PDSCH transmission. For example, the HARQ process ID for a downlink SPS transmission may be determined based at least in part on a starting symbol number for that downlink SPS transmission. In previous techniques, the HARQ process identifier may be based at least in part on the slot index associated with transmissions scheduled via SPS. However, because SPS can have sub-slot periodicity, some aspects described herein may determine the HARQ process ID based at least in part on a symbol index within a slot. For example, the HARQ process ID can be based at least in part on the current symbol number, periodicity (in symbols), and the number of HARQ processes. The following is one example technique to find the HARQ process ID:

HARQ process ID=[floor(current symbol number/ periodicity)]modulo number of HARQ processes.

The current symbol number may be based at least in part on the subframe number (SFN), a number of slots per frame, a number of symbols per slot, the slot number in the frame, the number of symbols per slot and the symbol number in the slot. For example, the following may be an example of determining the current symbol number:

current symbol number=SFN×number of slots per frame×number of symbols per slot+slot number in frame×number of symbols per slot+symbol number in the slot, where the number of slots per frame and the number of symbols per slot refer to the number of consecutive slots per frame and the number of consecutive symbols per slot.

Accordingly, example 700 of FIG. 7 enables ACK/NACK feedback to be generated and transmitted for downlink SPS with sub-slot periodicity. As such, latency associated with feeding back ACK/NACKs associated with transmissions received within a same slot can be reduced by generating ACK/NACK feedback and transmitting the ACK/NACK feedback within a single second slot. Therefore, it may not be necessary to send multiple ACK/NACKs across multiple second slots (which increases latency), as performed in previous techniques that use only one PUCCH resource that is not configured for sub-slot periodicity.

As indicated above, FIG. 7 is provided as an example. Other examples are possible and may differ from what was described with respect to FIG. 7.

Figure 8:
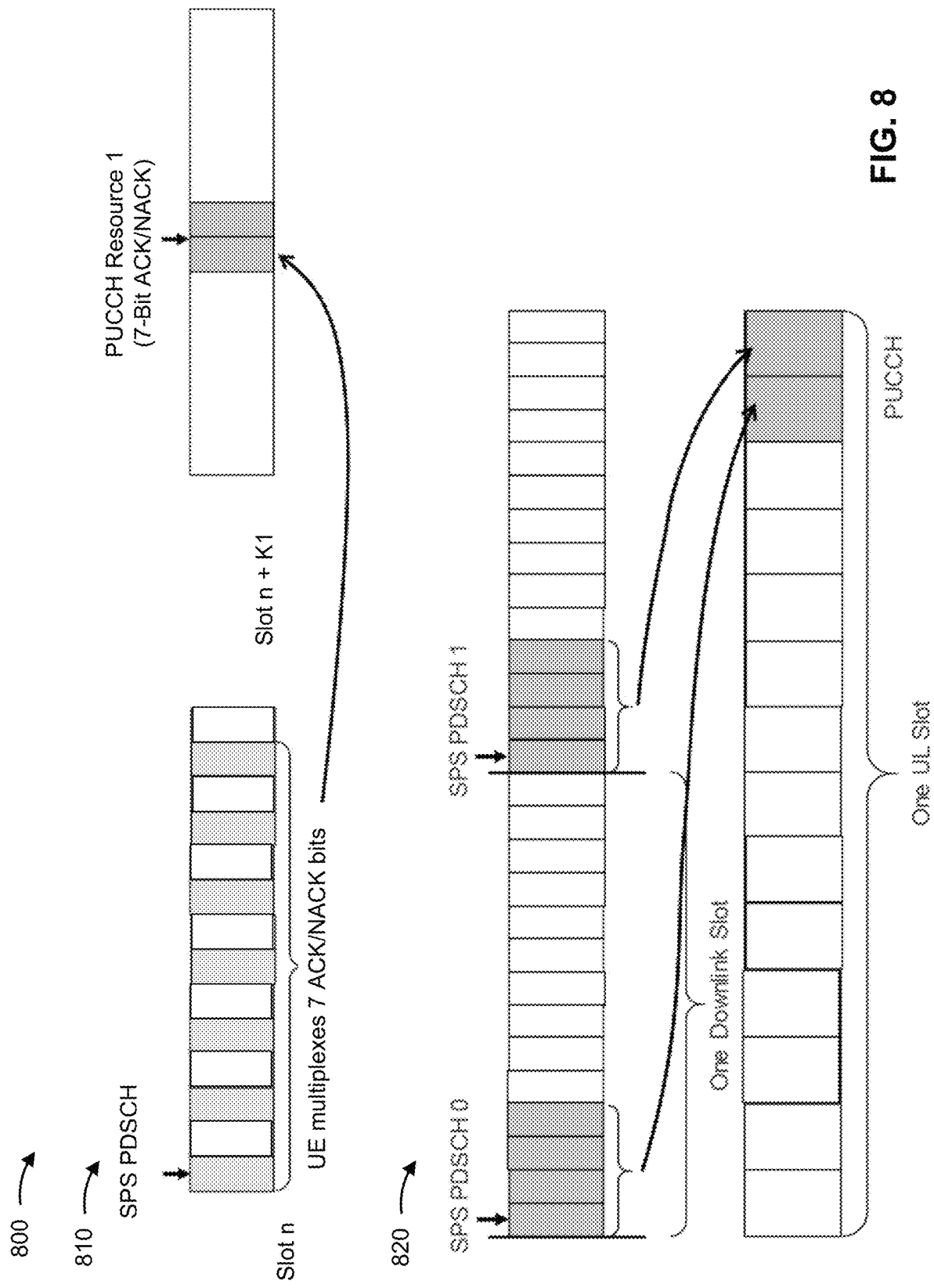

FIG. 8 is a diagram illustrating an example 800 of providing acknowledgement/negative acknowledgement (ACK/NACK) feedback for downlink semi-persistent scheduling (SPS) with sub-slot periodicity, in accordance with various aspects of the present disclosure. FIG. 8 shows a first example 810 and a second example 820.

In the first example 810 of FIG. 8, a first slot (slot n, where n is a slot number) includes a plurality of PDSCH transmissions (shown as seven PDSCH transmissions) and a second slot (slot n+K1) includes a PUCCH resource (PUCCH Resource 1) for transmitting ACK/NACK feedback associated with the PDSCH transmissions.

As shown in FIG. 8, the first slot includes seven SPS PDSCH transmissions. According to some aspects, UE 120 may multiplex all ACK/NACKs for the seven PDSCH transmissions to generate the ACK/NACK feedback. As such, as shown by the first example 810, the ACK/NACK feedback may include seven bits and be transmitted in a PUCCH resource (PUCCH Resource 1). In some aspects, PUCCH Resource 1 may be included within one or more symbols of the second slot.

In some aspects, PUCCH Resource 1 is identified in the configuration for the downlink SPS. Additionally, or alternatively, the DCI may signal timing (e.g., a K1 timing) to identify timing between the first slot and the second slot. In some aspects, dynamically scheduled PDSCH transmissions may be included within the first slot in addition to the SPS PDSCH transmissions. In such cases, PUCCH Resource 1 may be identified by a PUCCH resource indicator in DCI via a PDCCH resource carrying a dynamically scheduled downlink grant. Accordingly, in some aspects, UE 120 may multiplex the respective ACK/NACKs associated with the SPS PDSCH transmissions and ACK/NACKs associated with dynamically scheduled PDSCH resources to generate ACK/NACK feedback. Accordingly, the multiplexed ACK/NACK feedback can be sent via the identified PUCCH Resource 1. In some aspects, UE 120 may further multiplex the multiple ACK/NACK bits associated with the SPS PDSCH transmissions and ACK/NACKs associated with dynamically scheduled PDSCH resources to generate one combined ACK/NACK feedback. Accordingly, this multiplexed ACK/NACK feedback can be associated with both downlink SPS PDSCH transmissions and dynamically scheduled PDSCH transmissions and be sent via the PUCCH resource associated with the dynamically scheduled PDSCH. For example, the PDCCH associated with the dynamically scheduled PDSCHs may include a PUCCH resource indicator field that indicates the PUCCH resource to transmit the multiplexed ACK/NACK feedback.

Accordingly, the first example 810 can enable individual HARQ retransmissions for respective PDSCH transmissions that are indicated as not received by the ACK/NACK feedback. While the first example 810 of FIG. 8 may enable an indication of whether each individual PDSCH transmission was successfully received, this results in more than one bit of PUCCH resources to be consumed. In some aspects, as described herein, a one bit ACK/NACK associated with the received PDSCH transmissions can be generated by UE 120.

As shown by second example 820 of FIG. 8, although some techniques and apparatuses described herein support ACK/NACK for downlink SPS with a sub-slot periodicity, these techniques and apparatuses can also apply to a scenario with mixed numerology, such as where one uplink slot has a length equal to multiple downlink slots (e.g., two downlink slots, four downlink slots, and/or the like). In this case, if the periodicity of downlink SPS is one downlink slot, then this is equivalent to a periodicity one half (½) of the uplink slot, as shown (or one fourth (¼) of the uplink slot when one uplink slot is the length of four downlink slots). This scenario can be viewed as a downlink SPS with sub-slot periodicity of an uplink slot (e.g., sub-uplink-slot periodicity), but with a periodicity of one downlink slot (e.g., a downlink-slot periodicity). In this case, multiple downlink SPS transmissions may occur in respective downlink slots, but ACK/NACK feedback for these multiple downlink SPS transmissions may be transmitted in the same uplink slot. Thus, techniques described herein extend to cover this case (e.g., multiplexing all ACK/NACKs and transmitting those ACK/NACKs in the same PUCCH resource in the uplink slot).

As indicated above, FIG. 8 is provided as an example. Other examples are possible and may differ from what was described with respect to FIG. 8.

Figure 9:
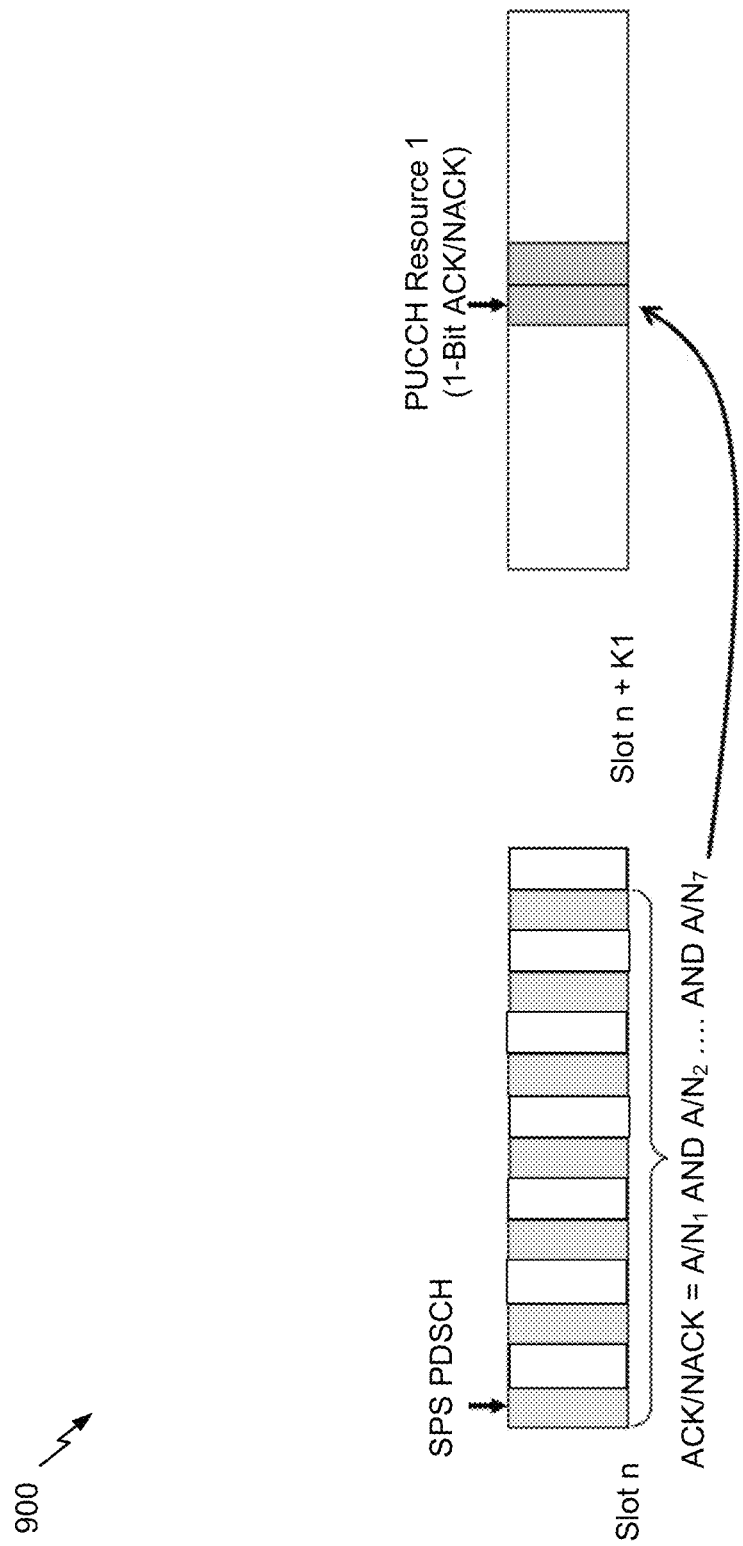

FIG. 9 is a diagram illustrating an example 900 of providing acknowledgement/negative acknowledgement (ACK/NACK) feedback for downlink semi-persistent scheduling (SPS) with sub-slot periodicity, in accordance with various aspects of the present disclosure. In example 900 of FIG. 9, a first slot (slot n, where n is a slot number) includes a plurality of PDSCH transmissions (shown as seven PDSCH transmissions) and a second slot (slot n+K1) includes a PUCCH resource (PUCCH Resource 1) for transmitting ACK/NACK feedback associated with the PDSCH transmissions.

As shown in FIG. 9, the first slot includes seven SPS PDSCH transmissions. According to some aspects, UE 120 may bundle all ACK/NACKs for the seven PDSCH transmissions to generate the ACK/NACK feedback by performing an AND operation on the respective ACK/NACKs for the seven PDSCH transmissions. As such, as shown by example 900, the ACK/NACK feedback may include one bit and be transmitted in PUCCH Resource 1. For example, the one bit ACK/NACK may be a 0 if any of the PDSCH transmissions are not received and a 1 if all of the PDSCH transmissions are received (or vice versa).

In some aspects, PUCCH Resource 1 is identified in the configuration for the downlink SPS. Additionally, or alternatively, the DCI may signal timing (e.g., a K1 timing) to identify timing between the first slot and the second slot. In some aspects, dynamically scheduled PDSCH transmissions may be included within the first slot in addition to the SPS PDSCH transmissions. In such cases, PUCCH Resource 1 may be identified by a PUCCH resource indicator in DCI via a PDCCH resource carrying a dynamically scheduled downlink grant. Accordingly, in some aspects, UE 120 may multiplex the one bit ACK/NACK feedback (e.g., representative of receipt of all PDSCH transmissions or non-receipt all PDSCH transmissions) associated with the SPS PDSCH transmissions and ACK/NACKs associated with dynamically scheduled PDSCH resources to generate ACK/NACK feedback. Accordingly, this multiplexed ACK/NACK feedback can be associated with both downlink SPS PDSCH transmissions and dynamically scheduled PDSCH transmissions and be sent via the PUCCH Resource associated with the dynamically scheduled PDSCH.

While example 900 of FIG. 9 may conserve PUCCH resources (e.g., by only using a one bit ACK/NACK feedback), example 900 does not provide a clear indication of whether each individual PDSCH transmission was successfully received because the ACK/NACK feedback indicates all PDSCH transmissions were received or none of the PDSCH transmissions were received (even though some of them might have been successfully received). As such, additional network resources may be consumed, as a HARQ retransmission may need to be performed for all of the PDSCH transmissions.

As indicated above, FIG. 9 is provided as an example. Other examples are possible and may differ from what was described with respect to FIG. 9.

Figure 10:
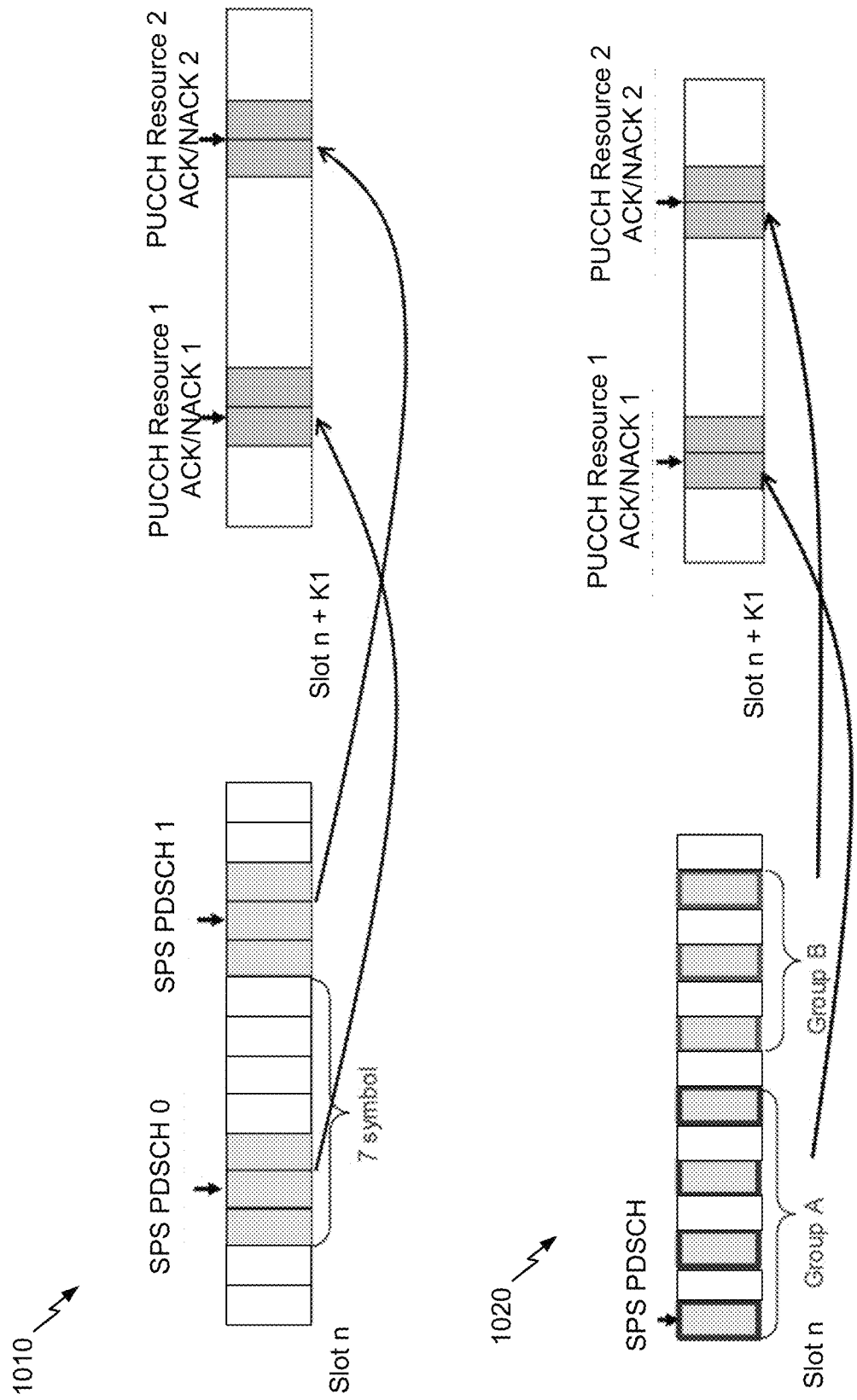

FIG. 10 includes diagrams illustrating examples 1010 and 1020 for providing acknowledgement/negative acknowledgement (ACK/NACK) feedback for downlink semi-persistent scheduling (SPS) with sub-slot periodicity, in accordance with various aspects of the present disclosure. In example 1010 of FIG. 10, a first slot (slot n, where n is a slot number) includes a plurality of PDSCH transmissions (shown as SPS PDSCH 0 and SPS PDSCH 1) and a second slot (slot n+K1) includes a plurality of PUCCH resources (PUCCH Resource 1 and PUCCH Resource 2) for transmitting ACK/NACK feedback associated with the PDSCH transmissions. As shown in example 1010, there is a seven symbol periodicity between SPS PDSCH 0 and SPS PDSCH 1 and SPS PDSCH 1 is received subsequent to SPS PDSCH 0.

In some aspects, PUCCH Resource 1 and PUCCH Resource 2 are identified in the configuration for the downlink SPS. Additionally, or alternatively, the DCI may signal timing (e.g., a K1 timing) and/or a PUCCH resource ID (e.g., via a PUCCH resource indicator) to identify timing between the first slot and the second slot and/or PUCCH Resource 1 and/or PUCCH Resource 2.

In some aspects, in example 1010, UE 120 may generate ACK/NACK feedback (ACK/NACK 1 and ACK/NACK 2) for SPS PDSCH 0 and SPS PDSCH 1, respectively. As shown, ACK/NACK 2 is transmitted subsequent to ACK/NACK 1. However, in some aspects, PUCCH Resource 1 and PUCCH Resource 2 may not be uniformly periodic. In other words, the number of symbols between PUCCH Resource 1 and PUCCH Resource 2 may be different from the number of symbols contained in half of the slot. For example, a number of symbols (e.g., a gap) between two PUCCH resources may be different from the seven symbol periodicity shown for receiving SPS PDSCH 0 and SPS PDSCH 1. As shown PUCCH Resource 1 and PUCCH Resource 2 are allocated in different symbols.

In example 1020 of FIG. 10, a first slot (slot n, where n is a slot number) includes a plurality of PDSCH transmissions (shown as seven SPS PDSCH transmissions) and a second slot (slot n+K1) includes a plurality of PUCCH resources (PUCCH Resource 1 and PUCCH Resource 2) for transmitting ACK/NACK feedback associated with the PDSCH transmissions. As shown, there is a two-symbol periodicity between SPS PDSCH 0 and SPS PDSCH 1. As further shown in example 1020, four of the seven PDSCH transmissions are configured to be in Group A and the remaining three PDSCH transmissions are configured to be in Group B. Other combinations of groupings are possible (e.g., five PDSCH transmissions and two PDSCH transmissions, six PDSCH transmissions and one PDSCH transmission, and/or the like). According to some aspects, the grouping does not change from slot to slot, as the grouping is defined according the configuration for downlink SPS.

In some aspects, the DCI may signal a slot number and/or a symbol number of a first PDSCH transmission. Furthermore, the DCI may include timing (e.g., a K1 timing) and/or a PUCCH resource ID (e.g., via a PUCCH resource indicator) to identify timing between the first slot and the second slot and/or PUCCH Resource 1 and/or PUCCH Resource 2. Additionally, or alternatively, PUCCH Resource 1 and PUCCH Resource 2 may be identified in the configuration for the downlink SPS.

In example 1020, UE 120 may identify which group PDSCH transmissions are in and combine all ACK/NACKs for those transmissions to generate ACK/NACK feedback for that group. As shown, UE 120 may generate first ACK/NACK feedback (ACK/NACK 1) for Group A and second ACK/NACK feedback (ACK/NACK 2) for Group B. Accordingly, ACK/NACK 1 may include multiplexed ACK/NACK feedback (e.g., a four bit ACK/NACK with individual ACK/NACKs associated with each PDSCH transmission) or a bundled ACK/NACK feedback (e.g., a one bit ACK/NACK representative of whether all four PDSCH transmissions were received (ACK) or not received (NACK)). Similarly, ACK/NACK 2 may include multiplexed ACK/NACK feedback (e.g., a three bit ACK/NACK with individual ACK/NACKs associated with each PDSCH transmission) or a bundled ACK/NACK feedback (e.g., a one bit ACK/NACK representative of whether all three PDSCH transmissions were received (ACK) or not received (NACK)). In some aspects, ACK/NACK feedback for Group A can be transmitted via on PUCCH Resource 2 and ACK/NACK feedback for Group B can be transmitted via PUCCH Resource 1 in the next slot.

As a specific example, a first PDSCH transmission of the first slot is received via PDSCH resources of Group B (e.g., in symbol 10 of slot n) and the DCI may indicate that the PUCCH resource for ACK/NACK feedback is PUCCH Resource 1 in the second slot (e.g., by DCI including K1 timing). In such an example, UE 120 may multiplex ACK/NACKs to generate ACK/NACK feedback corresponding to the first PDSCH transmission and all subsequent PDSCH transmissions in Group B (e.g., a PDSCH transmission in symbol 12 of slot n) and transmit the ACK/NACK feedback via PUCCH Resource 1. Accordingly, in a next slot (slot n+1), UE 120 may multiplex the ACK/NACKs for all PDSCH transmissions in group A to generate ACK/NACK feedback and transmit that ACK/NACK feedback on the next PUCCH resource (i.e., PUCCH Resource 2 in slot n+K1). As such, ACK/NACK feedback for subsequent groups of PDSCH transmissions are transmitted using subsequent PUCCH resources. In some aspects, the group of PDSCHs and the corresponding ACK/NACK feedback may happen within the same slot. In the above example, if K1=1 slot, then the ACK/NACKs for all PDSCH transmissions in group A in slot n+1 will be transmitted on the PUCCH resource 2 in slot n+1.

Accordingly, examples 1010 and 1020 enable sub-slot periodicity of ACK/NACK feedback for a plurality of transmissions received with sub-slot periodicity. As such, examples 1010 and 1020 may enable UE 120 to more quickly and efficiently communicate ACK/NACK feedback to BS 110 relative to previous techniques.

As indicated above, FIG. 10 is provided as an example. Other examples are possible and may differ from what was described with respect to FIG. 10.

Figure 11:
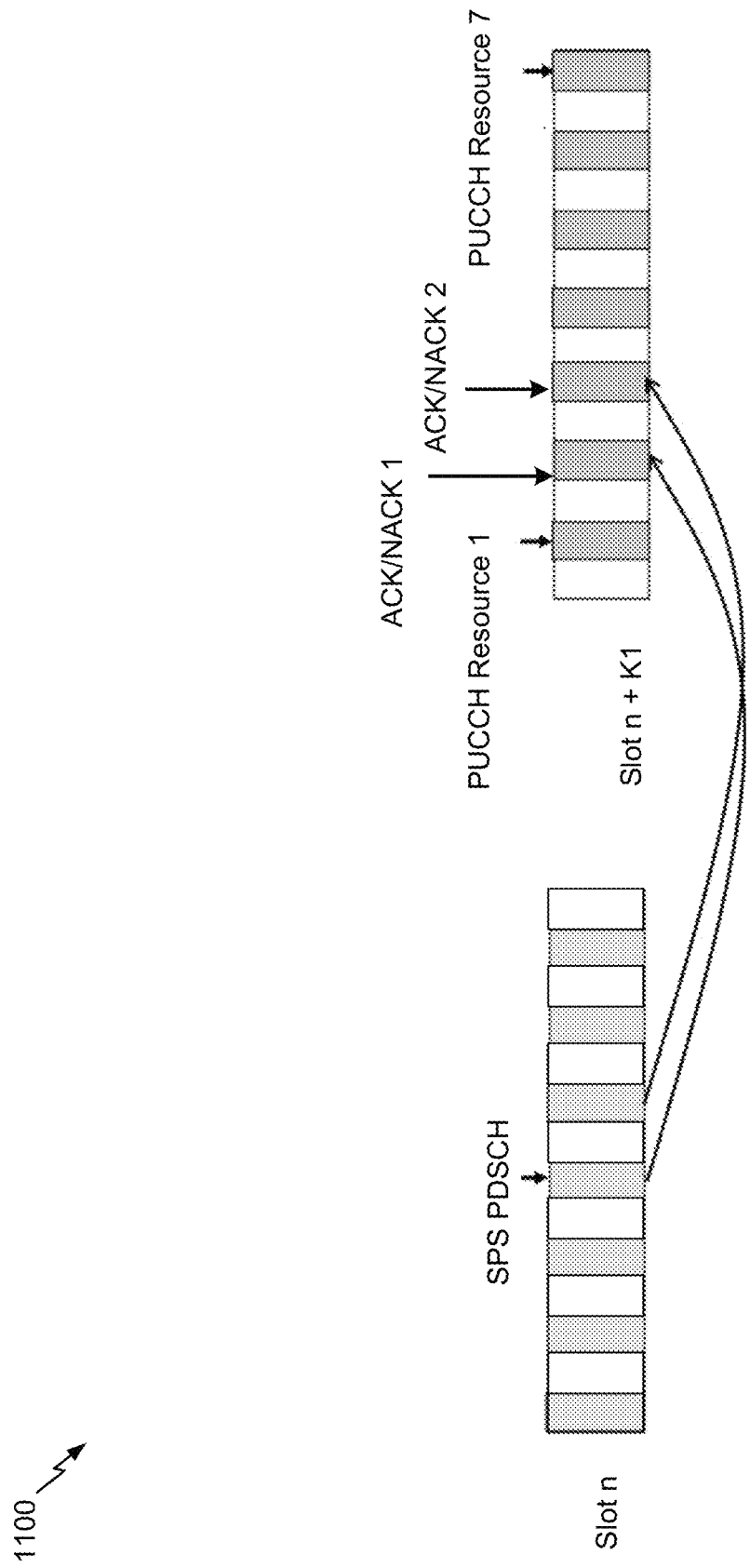

FIG. 11 is a diagram illustrating an example 1100 of providing acknowledgement/negative acknowledgement (ACK/NACK) feedback for downlink semi-persistent scheduling (SPS) with sub-slot periodicity, in accordance with various aspects of the present disclosure. In example 1100 of FIG. 11, a first slot (slot n, where n is a slot number) includes a plurality of PDSCH transmissions (shown as seven SPS PDSCH transmissions) and a second slot (slot n+K1) includes a plurality of PUCCH resources (shown as PUCCH Resource 1 to PUCCH Resource 7) for transmitting ACK/NACK feedback associated with the PDSCH transmissions.

In some aspects, the configuration for downlink SPS may include a PUCCH configuration that configures a same number of PUCCH resources per slot as the number of PDSCH transmissions per slot. Additionally, or alternatively, the DCI may signal starting symbol of a first PDSCH transmission received in the first slot and a corresponding PUCCH resource to transmit ACK/NACK 1 in the second slot. Accordingly, UE 120 may generate ACK/NACK 1 based on whether the first PDSCH transmission was successfully received and transmit ACK/NACK 1 via the identified PUCCH resource. Furthermore, as shown, a subsequently received PDSCH transmission may be received and UE 120 may generate ACK/NACK 2 and transmit ACK/NACK 2 via a PUCCH resource subsequent to the PUCCH resource used to transmit ACK/NACK 1. For example, the subsequent PUCCH resource may be calculated as previous PUCCH resource+Z symbols, where the previous PUCCH resource would be the PUCCH resource used to transmit ACK/NACK 1 and Z=downlink SPS periodicity. In this case, the base station 110 may only configure the first PUCCH resource for transmitting the first ACK NACK, and the PUCCH resources for transmitting subsequent ACK/NACKs may be determined by the UE 120 from the first PUCCH resource and the downlink SPS periodicity. In some aspects, the subsequent PUCCH resource may be calculated using fewer than Z symbols. In some aspects, the PDSCH and the corresponding ACK/NACKs may happen in a same slot on different symbols. For example, a first PDSCH may be transmitted on symbol 2 in slot n, and the corresponding ACK/NACK may be transmitted on a PUCCH resource on symbol 10 in the same slot. A second PDSCH may be transmitted on symbol 4 in slot n, and the corresponding ACK/NACK may be transmitted on a PUCCH resource on symbol 12 in the same slot.

Accordingly, example 1100 may enable sub-slot periodicity of ACK/NACK feedback for a plurality of transmissions received with sub-slot periodicity. In example 1100, latency can be relatively minimized as a same number PUCCH resources are allocated for ACK/NACK feedback as the number PDSCH transmissions that are configured to be received per slot. Further, processing resources can be conserved by configuring the PUCCH resources to have the same periodicity as the PDSCH transmissions.

As indicated above, FIG. 11 is provided as an example. Other examples are possible and may differ from what was described with respect to FIG. 11.

Figure 12:
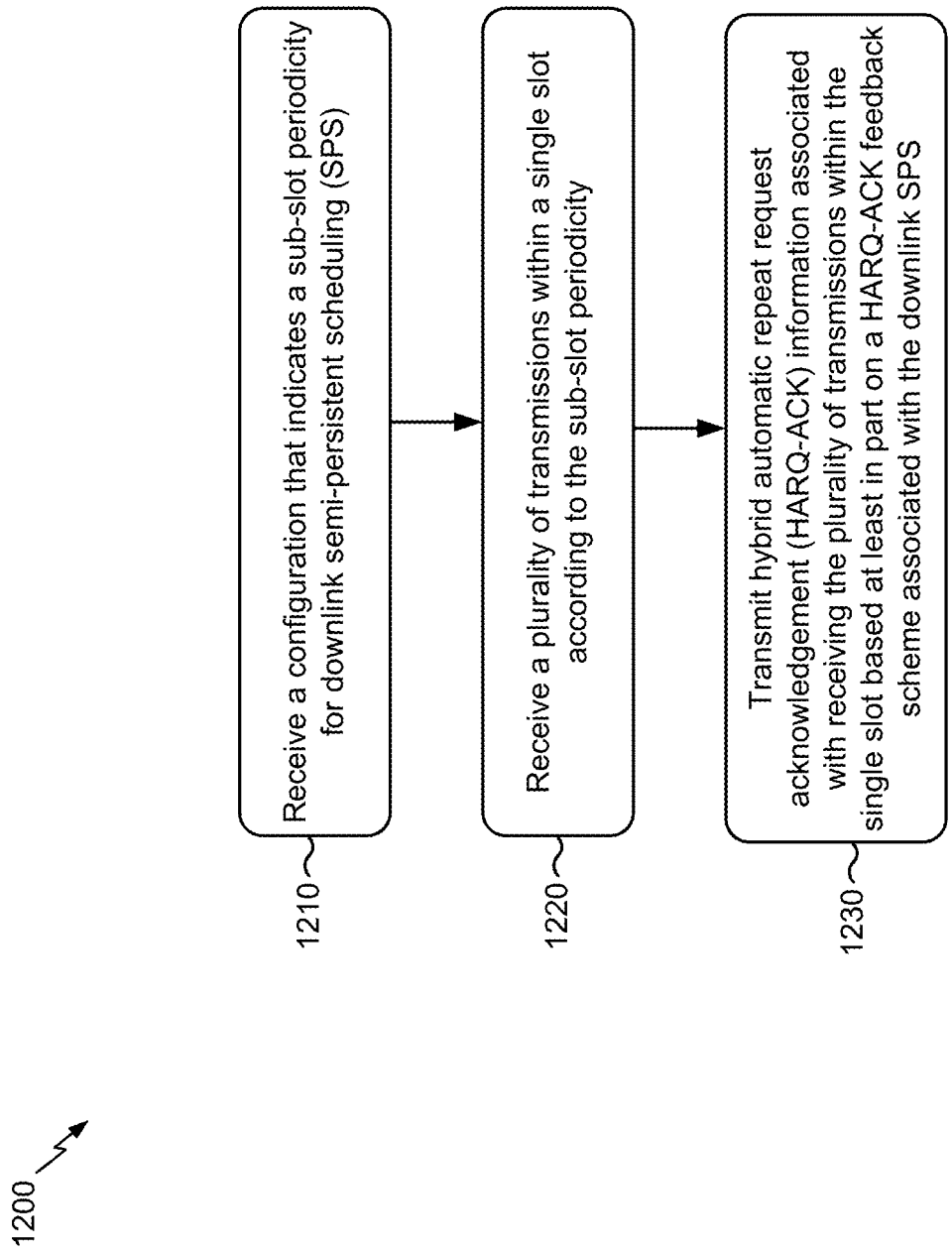
FIGS. 12 and 13 are diagrams illustrating example processes performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where a UE (e.g., UE 120) generates ACK/NACK feedback from transmissions received with sub-slot periodicity.

As shown in FIG. 12, in some aspects, process 1200 may include receiving a configuration that indicates a sub-slot periodicity for downlink semi-persistent scheduling (SPS) (block 1210). For example, the UE (e.g., using receive processor 258, transmit processor 264, controller/processor 280, memory 282, and/or the like) may receive a configuration that indicates a sub-slot periodicity for downlink SPS, as described above.

As further shown in FIG. 12, in some aspects, process 1200 may include receiving a plurality of transmissions within a single slot according to the sub-slot periodicity (block 1220). For example, the UE (e.g., using receive processor 258, transmit processor 264, controller/processor 280, memory 282, and/or the like) may receive a plurality of transmissions within a single slot according to the sub-slot periodicity, as described above.

As further shown in FIG. 12, in some aspects, process 1200 may include transmitting hybrid automatic repeat request acknowledgement (HARQ-ACK) information associated with receiving the plurality of transmissions within the single slot based at least in part on a HARQ-ACK feedback scheme associated with the downlink SPS (block 1230). For example, the UE (e.g., using receive processor 258, transmit processor 264, controller/processor 280, memory 282, and/or the like) may transmit hybrid automatic repeat request acknowledgement (HARQ-ACK) information associated with receiving the plurality of transmissions within the single slot based at least in part on a HARQ-ACK feedback scheme associated with the downlink SPS, as described above.

Process 1200 may include additional aspects, such as any single aspect or any combination of aspects described below and/or in connection with one or more other processes described elsewhere herein.

In a first aspect, the configuration for the downlink SPS identifies one physical uplink control channel (PUCCH) resource for the HARQ-ACK information.

In a second aspect, alone or in combination with the first aspect, the HARQ-ACK information has a number of bits corresponding to a number of physical downlink shared channel (PDSCH) transmissions received in a slot.

In a third aspect, alone or in combination with one or more of the first and second aspects, the HARQ-ACK information comprises a seven-bit multiplexed HARQ-ACK information when the sub-slot periodicity comprises a two symbol periodicity, or. In some aspects, the HARQ-ACK information comprises a two-bit multiplexed HARQ-ACK information when the sub-slot periodicity comprises a seven symbol periodicity.

In a fourth aspect, alone or in combination with one or more of the first through third aspects, the HARQ-ACK information is transmitted via a resource of a physical uplink control channel (PUCCH) based at least in part on at least one of the configuration for downlink SPS or downlink control information (DCI) that activates the downlink SPS.

In a fifth aspect, alone or in combination with one or more of the first through fourth aspects, the HARQ-ACK information is transmitted via a physical uplink control channel (PUCCH).

In a sixth aspect, alone or in combination with one or more of the first through fifth aspects, a first format of the PUCCH is used for a first sub-slot periodicity and a second format of the PUCCH is used for a second sub-slot periodicity. In some aspects, the first format is different from the second format.

In a seventh aspect, alone or in combination with one or more of the first through sixth aspects, the HARQ-ACK information comprises first HARQ-ACK information associated with the downlink SPS multiplexed with second HARQ-ACK information associated with dynamic scheduling.

In an eighth aspect, alone or in combination with one or more of the first through seventh aspects, the HARQ-ACK information is transmitted via a resource of a physical uplink control channel (PUCCH) indicated by a PUCCH resource indicator of downlink control information (DCI) received via a physical downlink control channel (PDCCH) carrying a dynamic scheduling downlink grant.

In a ninth aspect, alone or in combination with one or more of the first through eighth aspects, the HARQ-ACK information comprises a one bit bundled HARQ-ACK information with a value representative of whether all transmissions of the plurality of transmissions are received or all transmissions of the plurality of transmissions are not received.

In a tenth aspect, alone or in combination with one or more of the first through ninth aspects, when a processing timeline requirement cannot be satisfied for at least one of the plurality of transmissions, the HARQ-ACK information is transmitted for remaining transmissions, of the plurality of transmissions, that satisfy the processing timeline requirement.

In an eleventh aspect, alone or in combination with one or more of the first through tenth aspects, the HARQ-ACK information comprises a number of bits corresponding to a number of transmissions that are received, within the single slot, that satisfy the processing timeline requirement.

In a twelfth aspect, alone or in combination with one or more of the first through eleventh aspects, the HARQ-ACK information comprises a one bit HARQ-ACK information with a value representative of whether all transmissions, of the plurality of transmissions, that satisfy the processing timeline requirement are received or all transmissions, of the plurality of transmissions, that satisfy the processing timeline requirement are not received.

In a thirteenth aspect, alone or in combination with one or more of the first through twelfth aspects, HARQ-ACK information bits of the HARQ-ACK information that are associated with the downlink SPS are dropped and ACK or NACKs of the HARQ-ACK information that are associated with dynamic scheduling are transmitted.

In a fourteenth aspect, alone or in combination with one or more of the first through thirteenth aspects, the plurality of transmissions are scheduled via the downlink SPS and the HARQ-ACK information indicates a NACK based at least in part on a determination that the processing timeline requirement cannot be satisfied for the at least one of the plurality of transmissions. In some aspects, the HARQ-ACK information is multiplexed with HARQ-ACK information associated with dynamically scheduled transmissions.

In a fifteenth aspect, alone or in combination with one or more of the first through fourteenth aspects, the HARQ-ACK information that indicates the NACK comprises a one bit NACK.

In a sixteenth aspect, alone or in combination with one or more of the first through fifteenth aspects, the HARQ-ACK information is dropped based at least in part on the at least one of the transmissions not satisfying the processing timeline requirement.

In a seventeenth aspect, alone or in combination with one or more of the first through sixteenth aspects, a hybrid automatic repeat request (HARD) process identifier, associated with each of the plurality transmissions, is based at least in part on a starting symbol number of a physical downlink shared channel (PDSCH) transmission.

In an eighteenth aspect, alone or in combination with one or more of the first through seventeenth aspects, the sub-slot periodicity is a sub-slot periodicity of an uplink slot.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
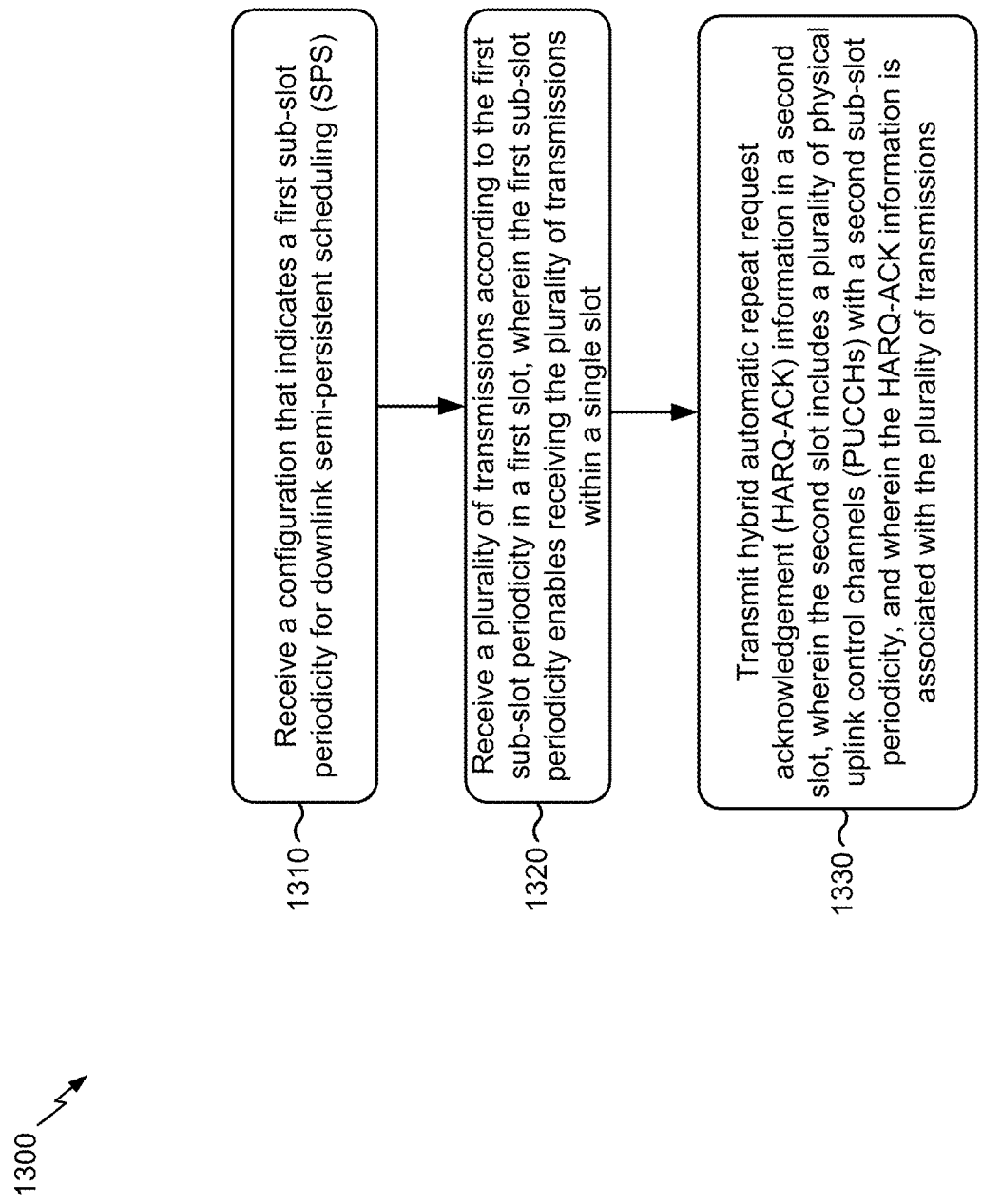

FIG. 13 is a diagram illustrating an example process 1300 performed, for example, by a UE, in accordance with various aspects of the present disclosure. Example process 1300 is an example where a UE (e.g., UE 120) performs providing ACK/NACK feedback associated with receiving a plurality of transmissions with sub-slot periodicity.

As shown in FIG. 13, in some aspects, process 1300 may include receiving a configuration that indicates a first sub-slot periodicity for downlink semi-persistent scheduling (SPS) (block 1310). For example, the UE (e.g., using receive processor 258, transmit processor 264, controller/processor 280, memory 282, and/or the like) may receive a configuration that indicates a first sub-slot periodicity for downlink semi-persistent scheduling (SPS, as described above.

As further shown in FIG. 13, in some aspects, process 1300 may include receiving a plurality of transmissions according to the first sub-slot periodicity in a first slot, wherein the first sub-slot periodicity enables receiving the plurality of transmissions within a single slot (block 1320). For example, the UE (e.g., using receive processor 258, transmit processor 264, controller/processor 280, memory 282, and/or the like) may receive a plurality of transmissions according to the first sub-slot periodicity in a first slot, as described above. In some aspects, the first sub-slot periodicity enables receiving the plurality of transmissions within a single slot.

As further shown in FIG. 13, in some aspects, process 1300 may include transmitting hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions (block 1330). For example, the UE (e.g., using receive processor 258, transmit processor 264, controller/processor 280, memory 282, and/or the like) may transmit hybrid automatic repeat request acknowledgement (HARQ-ACK) information in a second slot, as described above. In some aspects, the second slot includes a plurality of physical uplink control channels (PUCCHs) with a second sub-slot periodicity. In some aspects, the HARQ-ACK information is associated with the plurality of transmissions.

Process 1300 may include additional aspects, such as any single aspect or any combination of aspects described below and/or in connection with one or more other processes described elsewhere herein.

In a first aspect, the configuration for the downlink SPS identifies a plurality of physical uplink control channel (PUCCH) resources for the HARQ-ACK information.

In a second aspect, alone or in combination with the first aspect, the HARQ-ACK information is transmitted within the second slot based at least in part on at least one of the configuration for downlink SPS or downlink control information (DCI) that activates the downlink SPS.

In a third aspect, alone or in combination with one or more of the first and second aspects, first HARQ-ACK information of the HARQ-ACK information and second HARQ-ACK information of the HARQ-ACK information are transmitted via subsequent PUCCH resources.

In a fourth aspect, alone or in combination with one or more of the first through third aspects, a number of symbols between two transmissions of the plurality of transmissions is different than a number of symbols between two sets of HARQ-ACK information included in the HARQ-ACK information.

In a fifth aspect, alone or in combination with one or more of the first through fourth aspects, a first set of HARQ-ACK information of the HARQ-ACK information corresponds to a first group of the plurality of transmissions and a second set of HARQ-ACK information of the HARQ-ACK information corresponds to a second group of the plurality of transmissions. In some aspects, the first group of the plurality of transmissions does not overlap with the second group of the plurality of transmissions.

In a sixth aspect, alone or in combination with one or more of the first through fifth aspects, the first set of HARQ-ACK information includes multiplexed HARQ-ACK information associated with the first group of the plurality of transmissions.

In a seventh aspect, alone or in combination with one or more of the first through sixth aspects, the multiplexed HARQ-ACK information is transmitted in a single physical uplink control channel (PUCCH).

In an eighth aspect, alone or in combination with one or more of the first through seventh aspects, the first set of HARQ-ACK information comprises a one bit bundled HARQ-ACK information representative of whether all transmissions of the first group of the plurality of transmissions were received.

In a ninth aspect, alone or in combination with one or more of the first through eighth aspects, the second set of HARQ-ACK information is transmitted via a subsequent PUCCH resource to a PUCCH resource that was used to transmit the first set of HARQ-ACK information.

In a tenth aspect, alone or in combination with one or more of the first through ninth aspects, the first sub-slot periodicity equals the second sub-slot periodicity.

In an eleventh aspect, alone or in combination with one or more of the first through tenth aspects, first HARQ-ACK information of HARQ-ACK information and second HARQ-ACK information of the HARQ-ACK information are transmitted via PUCCH resources.

In a twelfth aspect, alone or in combination with one or more of the first through eleventh aspects, a hybrid automatic repeat request (HARD) process identifier, associated with each of the plurality transmissions, is based at least in part on a starting symbol number of a physical downlink shared channel (PDSCH) transmission.

In a thirteenth aspect, alone or in combination with one or more of the first through twelfth aspects, the configuration comprises a bitmap that indicates a plurality of starting locations for a plurality of physical downlink shared channel (PDSCH) transmissions within a single slot.

In a fourteenth aspect, alone or in combination with one or more of the first through thirteenth aspects, the configuration indicates a number of physical uplink control channel (PUCCH) resources per slot. In some aspects, the number of PUCCH resources corresponds to a number of downlink SPS physical downlink shared channel (PDSCH) transmissions per slot.

In a fifteenth aspect, alone or in combination with one or more of the first through fourteenth aspects, PUCCH resources of the number of PUCCH resources are not uniformly spaced in time per slot.

In a sixteenth aspect, alone or in combination with one or more of the first through fifteenth aspects, the first sub-slot periodicity is a sub-slot periodicity of an uplink slot.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
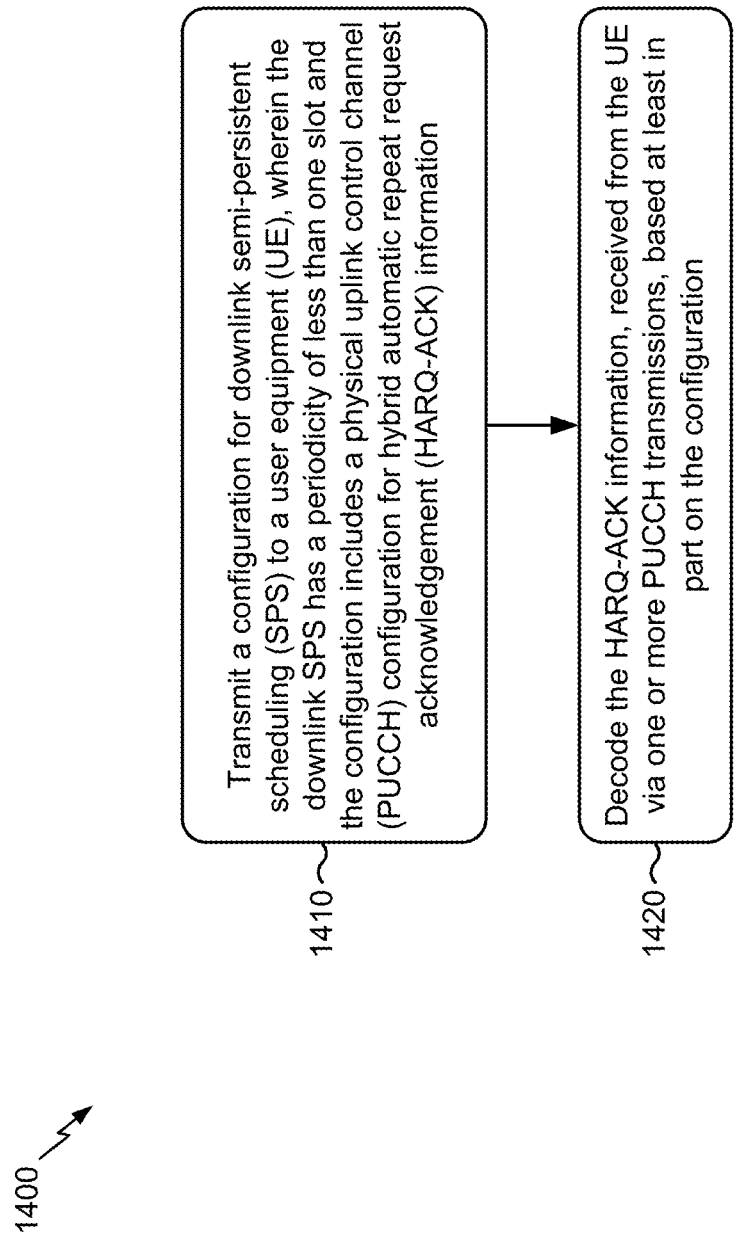
FIG. 14 is a diagram illustrating an example process performed, for example, by a base station, in accordance with various aspects of the present disclosure.

FIG. 14 is a diagram illustrating an example process 1400 performed, for example, by a base station, in accordance with various aspects of the present disclosure. Example process 1400 is an example where a BS (e.g., BS 110) configures downlink SPS with sub-slot periodicity and decodes ACK/NACK according to the configured downlink SPS.

As shown in FIG. 14, in some aspects, process 1400 may include transmitting a configuration for downlink semi-persistent scheduling (SPS) to a user equipment (UE), wherein the downlink SPS has a periodicity of less than one slot and the configuration includes a physical uplink control channel (PUCCH) configuration for hybrid automatic repeat request acknowledgement (HARQ-ACK) information (block 1410). For example, the base station (e.g., using transmit processor 220, receive processor 238, controller/processor 240, memory 242, and/or the like) may transmit a configuration for downlink SPS to a UE, as described above. In some aspects, the downlink SPS has a periodicity of less than one slot and the configuration includes a physical uplink control channel (PUCCH) configuration for hybrid automatic repeat request acknowledgement (HARQ-ACK) information.

As further shown in FIG. 14, in some aspects, process 1400 may include decoding the HARQ-ACK information, received from the UE via one or more PUCCH transmissions, based at least in part on the configuration (block 1420). For example, the base station (e.g., using transmit processor 220, receive processor 238, controller/processor 240, memory 242, and/or the like) may decode the HARQ-ACK information, received from the UE via one or more PUCCH transmissions, based at least in part on the configuration, as described above.

Process 1400 may include additional aspects, such as any single aspect or any combination of aspects described below and/or in connection with one or more other processes described elsewhere herein.

In a first aspect, the configuration comprises a bitmap that indicates a plurality of starting locations for a plurality of physical downlink shared channel (PDSCH) transmissions within a single slot.

In a second aspect, alone or in combination with the first aspect, the configuration indicates a number of physical downlink shared channel (PDSCH) transmissions within a single slot.

In a third aspect, alone or in combination with one or more of the first and second aspects, a duration of each PDSCH transmission is included within downlink control information (DCI).

In a fourth aspect, alone or in combination with one or more of the first through third aspects, the configuration includes a parameter that identifies one of a plurality of schemes for the HARQ-ACK information. In some aspects, the parameter is to be used by the UE to generate the HARQ-ACK information.

In a fifth aspect, alone or in combination with one or more of the first through fourth aspects, the configuration is semi-statically configured via radio resource control (RRC) signaling or dynamically configured via an activation of SPS within downlink control information (DCI).

In a sixth aspect, alone or in combination with one or more of the first through fifth aspects, the configuration indicates that one PUCCH resource per slot is to carry a number of bits for the HARQ-ACK information. In some aspects, the number of bits corresponds to a number of downlink SPS physical downlink shared channel (PDSCH) transmissions per slot.

In a seventh aspect, alone or in combination with one or more of the first through sixth aspects, the configuration indicates a format for the PUCCH, and the format is associated with a number of bits for the HARQ-ACK information.

In an eighth aspect, alone or in combination with one or more of the first through seventh aspects, the configuration indicates that two PUCCH resources are assigned per slot, an allocation of each of the two PUCCH resources, and a format of the two PUCCH resources.

In a ninth aspect, alone or in combination with one or more of the first through eighth aspects, timing between the two PUCCH resources within a slot is indicated via activation downlink control information (DCI).

In a tenth aspect, alone or in combination with one or more of the first through ninth aspects, the configuration indicates a number of PUCCH resources per slot. In some aspects, the number of PUCCH resources corresponds to a number of downlink SPS physical downlink shared channel (PDSCH) transmissions per slot.

In an eleventh aspect, alone or in combination with one or more of the first through tenth aspects, PUCCH resources of the number of PUCCH resources are not uniformly spaced in time per slot.

In a twelfth aspect, alone or in combination with one or more of the first through eleventh aspects, a hybrid automatic repeat request (HARD) process identifier, associated with the each of the plurality of transmissions, is based at least in part on a starting symbol number of a physical downlink shared channel (PDSCH) transmission.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with the phrase "the one or more."

Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based at least in part on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a configuration that indicates a first sub-slot periodicity for downlink semi-persistent scheduling (SPS), wherein the first sub-slot periodicity is a periodicity of a quantity of symbols;
   receiving a plurality of transmissions according to the first sub-slot periodicity in a first slot, wherein the first sub-slot periodicity enables receiving the plurality of transmissions within a single slot in accordance with the periodicity of the quantity of symbols; and
   transmitting hybrid automatic repeat request acknowledgement (HARQ-ACK) information in a second slot, wherein the second slot includes a plurality of physical uplink control channels (PUCCHs) with a second sub-slot periodicity, and wherein the HARQ-ACK information is associated with the plurality of transmissions.

2. The method of claim 1, wherein the configuration for the downlink SPS identifies a plurality of physical uplink control channel (PUCCH) resources for the HARQ-ACK information.

3. The method of claim 1, wherein the HARQ-ACK information is transmitted within the second slot based at least in part on at least one of the configuration for downlink SPS or downlink control information (DCI) that activates the downlink SPS.

4. The method of claim 1, wherein first HARQ-ACK information of the HARQ-ACK information and second HARQ-ACK information of the HARQ-ACK information are transmitted via subsequent PUCCH resources,
   wherein the first HARQ-ACK information is associated with a first transmission of the plurality of transmissions and the second HARQ-ACK information is associated with a second transmission of the plurality of transmissions,
   wherein the second transmission is received subsequent to the first transmission.

5. The method of claim 1, wherein the quantity of symbols is different than a quantity of symbols between two sets of HARQ-ACK information included in the HARQ-ACK information.

6. The method of claim 1, wherein a first set of HARQ-ACK information of the HARQ-ACK information corresponds to a first group of the plurality of transmissions and a second set of HARQ-ACK information of the HARQ-ACK information corresponds to a second group of the plurality of transmissions, wherein the first group of the plurality of transmissions does not overlap with the second group of the plurality of transmissions.

7. The method of claim 6, wherein the first set of HARQ-ACK information includes multiplexed HARQ-ACK information associated with the first group of the plurality of transmissions.

8. The method of claim 7, wherein the multiplexed HARQ-ACK information is transmitted in a single physical uplink control channel (PUCCH).

9. The method of claim 7, wherein the first set of HARQ-ACK information comprises a one bit bundled HARQ-ACK information representative of whether all transmissions of the first group of the plurality of transmissions were received.

10. The method of claim 7, wherein the second set of HARQ-ACK information is transmitted via a subsequent PUCCH resource to a PUCCH resource that was used to transmit the first set of HARQ-ACK information.

11. The method of claim 1, wherein the first sub-slot periodicity equals the second sub-slot periodicity.

12. The method of claim 1, wherein first HARQ-ACK information of HARQ-ACK information and second HARQ-ACK information of the HARQ-ACK information are transmitted via PUCCH resources,
wherein the first HARQ-ACK information is associated with a first transmission of the plurality of transmissions and the second HARQ-ACK information is associated with a second transmission of the plurality of transmissions,
wherein the second transmission is received subsequent to the first transmission, and
wherein the first HARQ-ACK information is transmitted via a first PUCCH resource of the PUCCH resources and the second HARQ-ACK information is transmitted via a second PUCCH resource of the PUCCH resources,
wherein the second PUCCH resource is transmitted subsequent to the first PUCCH resource corresponding to the second transmission being received subsequent to the first transmission.

13. The method of claim 1, wherein a hybrid automatic repeat request (HARD) process identifier, associated with each of the plurality of transmissions, is based at least in part on a starting symbol number of a physical downlink shared channel (PDSCH) transmission.

14. The method of claim 1, wherein the configuration comprises a bitmap that indicates a plurality of starting locations for a plurality of physical downlink shared channel (PDSCH) transmissions within a single slot.

15. The method of claim 1, wherein the configuration indicates a quantity of physical uplink control channel (PUCCH) resources per slot, wherein the quantity of PUCCH resources corresponds to a quantity of downlink SPS physical downlink shared channel (PDSCH) transmissions per slot.

16. The method of claim 15, wherein PUCCH resources of the quantity of PUCCH resources are not uniformly spaced in time per slot.

17. The method of claim 1, wherein the first sub-slot periodicity is a sub-slot periodicity of an uplink slot.

18. A method of wireless communication performed by a user equipment (UE), comprising:
receiving a configuration that indicates a sub-slot periodicity for downlink semi-persistent scheduling (SPS), wherein the sub-slot periodicity is a periodicity of a quantity of symbols;
receiving a plurality of transmissions within a single slot according to the sub-slot periodicity; and
transmitting hybrid automatic repeat request acknowledgement (HARQ-ACK) information associated with receiving the plurality of transmissions within the single slot based at least in part on a HARQ-ACK feedback scheme associated with the downlink SPS.

19. The method of claim 18, wherein the configuration for the downlink SPS identifies one physical uplink control channel (PUCCH) resource for the HARQ-ACK information.

20. The method of claim 18, wherein the HARQ-ACK information has a quantity of bits corresponding to a quantity of physical downlink shared channel (PDSCH) transmissions received in a slot.

21. The method of claim 18, wherein the HARQ-ACK information comprises a seven-bit multiplexed HARQ-ACK information when the sub-slot periodicity comprises a two symbol periodicity, or wherein the HARQ-ACK information comprises a two-bit multiplexed HARQ-ACK information when the sub-slot periodicity comprises a seven symbol periodicity.

22. The method of claim 18, wherein the HARQ-ACK information is transmitted via a resource of a physical uplink control channel (PUCCH) based at least in part on at least one of the configuration for downlink SPS or downlink control information (DCI) that activates the downlink SPS.

23. The method of claim 18, wherein the HARQ-ACK information is transmitted via a physical uplink control channel (PUCCH).

24. The method of claim 23, wherein a first format of the PUCCH is used for a first sub-slot periodicity and a second format of the PUCCH is used for a second sub-slot periodicity, wherein the first format is different from the second format.

25. The method of claim 18, wherein the HARQ-ACK information comprises first HARQ-ACK information associated with the downlink SPS multiplexed with second HARQ-ACK information associated with dynamic scheduling.

26. The method of claim 25, wherein the HARQ-ACK information is transmitted via a resource of a physical uplink control channel (PUCCH) indicated by a PUCCH resource indicator of downlink control information (DCI) received via a physical downlink control channel (PDCCH) carrying a dynamic scheduling downlink grant.

27. The method of claim 18, wherein the HARQ-ACK information comprises a one bit bundled HARQ-ACK information with a value representative of whether all transmissions of the plurality of transmissions are received or all transmissions of the plurality of transmissions are not received.

28. The method of claim 18, wherein, when a processing timeline requirement cannot be satisfied for at least one of the plurality of transmissions, the HARQ-ACK information is transmitted for remaining transmissions, of the plurality of transmissions, that satisfy the processing timeline requirement.

29. The method of claim 28, wherein the HARQ-ACK information comprises a quantity of bits corresponding to a quantity of transmissions that are received, within the single slot, that satisfy the processing timeline requirement.

30. The method of claim 28, wherein the HARQ-ACK information comprises a one bit HARQ-ACK information with a value representative of whether all transmissions, of the plurality of transmissions, that satisfy the processing timeline requirement are received or all transmissions, of the plurality of transmissions, that satisfy the processing timeline requirement are not received.

31. The method of claim 28, wherein HARQ-ACK information bits of the HARQ-ACK information that are associated with the downlink SPS are dropped and ACK or NACKs of the HARQ-ACK information that are associated with dynamic scheduling are transmitted.

32. The method of claim 28, wherein the plurality of transmissions are scheduled via the downlink SPS and the HARQ-ACK information indicates a NACK based at least in part on a determination that the processing timeline requirement cannot be satisfied for the at least one of the plurality of transmissions, and wherein the HARQ-ACK information is multiplexed with HARQ-ACK information associated with dynamically scheduled transmissions.

33. The method of claim 32, wherein the HARQ-ACK information that indicates the NACK comprises a one bit NACK.

34. The method of claim 28, wherein the HARQ-ACK information is dropped based at least in part on the at least one of the transmissions not satisfying the processing timeline requirement.

35. The method of claim 18, wherein a hybrid automatic repeat request (HARD) process identifier, associated with each of the plurality of transmissions, is based at least in part on a starting symbol number of a physical downlink shared channel (PDSCH) transmission.

36. The method of claim 18, wherein the sub-slot periodicity is a sub-slot periodicity of an uplink slot.

37. A method of wireless communication performed by a base station (BS), comprising:
transmitting a configuration for downlink semi-persistent scheduling (SPS) to a user equipment (UE),
wherein the downlink SPS has a periodicity of less than one slot and the configuration includes a physical uplink control channel (PUCCH) configuration for hybrid automatic repeat request acknowledgement (HARQ-ACK) information, and
wherein the periodicity is a quantity of symbols;
transmitting a plurality of transmissions within a single slot and in accordance with the periodicity; and
decoding the HARQ-ACK information, received from the UE via one or more PUCCH transmissions, based at least in part on the configuration and the plurality of transmissions.

38. The method of claim 37, wherein the configuration comprises a bitmap that indicates a plurality of starting locations for a plurality of physical downlink shared channel (PDSCH) transmissions within a single slot.

39. The method of claim 37, wherein the configuration indicates a quantity of physical downlink shared channel (PDSCH) transmissions within a single slot.

40. The method of claim 37, wherein a duration of each PDSCH transmission is included within downlink control information (DCI).

41. The method of claim 37, wherein the configuration includes a parameter that identifies one of a plurality of schemes for the HARQ-ACK information,
wherein the parameter is to be used by the UE to generate the HARQ-ACK information.

42. The method of claim 37, wherein the configuration is semi-statically configured via radio resource control (RRC) signaling or dynamically configured via an activation of SPS within downlink control information (DCI).

43. The method of claim 37, wherein the configuration indicates that one PUCCH resource per slot is to carry a quantity of bits for the HARQ-ACK information, wherein the quantity of bits corresponds to a quantity of downlink SPS physical downlink shared channel (PDSCH) transmissions per slot.

44. The method of claim 37, wherein the configuration indicates a format for the PUCCH, and the format is associated with a quantity of bits for the HARQ-ACK information.

45. The method of claim 37, wherein the configuration indicates that two PUCCH resources are assigned per slot, an allocation of each of the two PUCCH resources, and a format of the two PUCCH resources.

46. The method of claim 45, wherein timing between the two PUCCH resources within a slot is indicated via activation downlink control information (DCI).

47. The method of claim 37, wherein the configuration indicates a quantity of PUCCH resources per slot, wherein the quantity of PUCCH resources corresponds to a quantity of downlink SPS physical downlink shared channel (PDSCH) transmissions per slot.

48. The method of claim 47, wherein PUCCH resources of the quantity of PUCCH resources are not uniformly spaced in time per slot.

49. The method of claim 37, wherein a hybrid automatic repeat request (HARD) process identifier, associated with the each of the plurality of transmissions, is based at least in part on a starting symbol number of a physical downlink shared channel (PDSCH) transmission.

50. A user equipment (UE) for wireless communication, comprising:
memory; and
one or more processors operatively coupled to the memory, the memory and the one or more processors configured to:
receive a configuration that indicates a first sub-slot periodicity for downlink semi-persistent scheduling (SPS), wherein the first sub-slot periodicity is a periodicity of a quantity of symbols;
receive a plurality of transmissions according to the first sub-slot periodicity in a first slot, wherein the first sub-slot periodicity enables receiving the plurality of transmissions within a single slot in accordance with the periodicity of the quantity of symbols; and
transmit hybrid automatic repeat request acknowledgement (HARQ-ACK) information in a second slot, wherein the second slot includes a plurality of physical uplink control channels (PUCCH) with a second sub-slot periodicity, and wherein the HARQ-ACK information is associated with the plurality of transmissions.

* * * * *